US012386025B2

(12) United States Patent
Rafii

(10) Patent No.: US 12,386,025 B2
(45) Date of Patent: Aug. 12, 2025

(54) METHODS AND APPARATUS TO IMPROVE DETECTION OF AUDIO SIGNATURES

(71) Applicant: Gracenote, Inc., Emeryville, CA (US)

(72) Inventor: Zafar Rafii, Berkley, CA (US)

(73) Assignee: Gracenote, Inc., New York, NY (US)

( * ) Notice: Subject to any disclaimer, the term of this patent is extended or adjusted under 35 U.S.C. 154(b) by 0 days.

(21) Appl. No.: 18/740,270

(22) Filed: Jun. 11, 2024

(65) Prior Publication Data
US 2024/0329186 A1    Oct. 3, 2024

Related U.S. Application Data

(63) Continuation of application No. 18/298,178, filed on Apr. 10, 2023, now Pat. No. 12,044,792, which is a
(Continued)

(51) Int. Cl.
*G01S 5/22* (2006.01)
*G01S 5/24* (2006.01)
(Continued)

(52) U.S. Cl.
CPC .................. *G01S 5/22* (2013.01); *G01S 5/24* (2013.01); *H04R 1/406* (2013.01); *H04R 3/005* (2013.01)

(58) Field of Classification Search
CPC ..... G01S 5/22; G01S 5/24; G01S 5/18; H04R 1/406; H04R 3/005
See application file for complete search history.

(56) References Cited

U.S. PATENT DOCUMENTS 5,481,294 A    1/1996 Thomas et al.
8,194,880 B2   6/2012 Avendano
(Continued)

FOREIGN PATENT DOCUMENTS

CA    3145158 A1 * 12/2020 ............... G01S 5/18
CN    107271963 A    10/2017
(Continued)

OTHER PUBLICATIONS

Peters et al., "Beamforming using a spherical microphone array based on legacy microphone charatertistics," [1http://www.antarestech.com/products/amm.shtm1J, Center for New Music and Audio Technologies (CNMAT), UC Berkeley, International Computer Science Institute (ICSI), 2011, 7 pages.
(Continued)

*Primary Examiner* — Daniel Pihulic
(74) *Attorney, Agent, or Firm* — McDonnell Boehnen Hulbert & Berghoff LLP

(57) ABSTRACT

Methods, apparatus, systems and articles of manufacture are disclosed to improve detection of audio signatures. An example apparatus includes at least one memory, instructions in the apparatus, and processor circuitry to execute the instructions to: determine a first time difference of arrival for a first audio sensor of a meter and a second audio sensor of the meter based on a first audio recording from the first audio sensor and a second audio recording from the second audio sensor; determine a second time difference of arrival for the first audio sensor and a third audio sensor of the meter based on the first audio recording and a third audio recording from the third audio sensor; determine a match by comparing the first time difference of arrival to i) a first virtual source time difference of arrival and ii) a second virtual source time difference of arrival; in response to determining that the first time difference of arrival matches the first virtual source time difference of arrival, identify a first virtual source location as the location of a media presentation device presenting media; and remove the second audio recording to reduce a computational burden on the processor.

20 Claims, 9 Drawing Sheets

Related U.S. Application Data continuation of application No. 17/541,020, filed on Dec. 2, 2021, now Pat. No. 11,656,318, which is a continuation of application No. 16/455,025, filed on Jun. 27, 2019, now Pat. No. 11,226,396.

(51) Int. Cl.
*H04R 1/40* (2006.01)
*H04R 3/00* (2006.01)

(56) References Cited

U.S. PATENT DOCUMENTS

| | | | |
|---|---|---|---|
| 9,069,065 B1 | 6/2015 | Coley et al. | |
| 9,503,783 B2 | 11/2016 | Lee | |
| 9,560,446 B1 | 1/2017 | Chang | |
| 10,225,730 B2 | 3/2019 | Nielsen | |
| 10,750,354 B2 | 8/2020 | Nielsen | |
| 11,226,396 B2* | 1/2022 | Rafii | H04R 1/406 |
| 11,656,318 B2* | 5/2023 | Rafii | G01S 5/24 367/127 |
| 12,044,792 B2* | 7/2024 | Rafii | H04R 1/406 |
| 2005/0035897 A1 | 2/2005 | Perl | |
| 2010/0053340 A1 | 3/2010 | Ikeda | |
| 2012/0076316 A1 | 3/2012 | Zhu | |
| 2012/0128175 A1 | 5/2012 | Visser | |
| 2012/0327746 A1 | 12/2012 | Velusamy | |
| 2014/0286497 A1 | 9/2014 | Thyssen | |
| 2015/0009072 A1 | 1/2015 | Nijsure | |
| 2016/0165341 A1 | 6/2016 | Benattar | |
| 2017/0094223 A1 | 3/2017 | Burenius | |
| 2017/0195793 A1 | 7/2017 | Vilemo | |
| 2017/0374546 A1 | 12/2017 | Nielsen | |
| 2019/0261162 A1 | 8/2019 | Nielsen | |
| 2020/0408874 A1* | 12/2020 | Rafii | G01S 5/24 |
| 2021/0037376 A1 | 2/2021 | Nielsen | |
| 2022/0091223 A1* | 3/2022 | Rafii | H04R 3/005 |
| 2023/0067774 A1* | 3/2023 | Nishimoto | G01S 5/0221 |
| 2023/0243918 A1* | 8/2023 | Rafii | H04R 1/406 367/127 |
| 2024/0329186 A1* | 10/2024 | Rafii | H04R 3/005 |

FOREIGN PATENT DOCUMENTS

| | | | | |
|---|---|---|---|---|
| CN | 108896962 A | | 11/2018 | |
| CN | 114731468 A | * | 7/2022 | G01S 5/18 |
| EP | 3699627 A1 | | 8/2020 | |
| EP | 3261274 A1 | | 8/2021 | |
| EP | 3910825 A1 | | 11/2021 | |
| EP | 3991442 A1 | * | 5/2022 | G01S 5/18 |
| KR | 20150025930 A | | 3/2015 | |
| WO | 2019077856 A1 | | 4/2019 | |
| WO | WO-2020263649 A1 | * | 12/2020 | G01S 5/18 |
| WO | WO-2024151946 A1 | * | 7/2024 | G06F 3/012 |

OTHER PUBLICATIONS

International Searching Authority, "International Search Report," issued Sep. 17, 2020 in connection with International Patent Application No. PCT/US2020/038114, 3 pages.

International Searching Authority, Written Opinion, issued Sep. 17, 2020 in connection with International Patent Application No. PCT/US2020/038114, 6 pages.

European Extended Search Report in connection with European Patent Application No. 20833119.9 issued Jun. 6, 2023, 9 pages.

Schorkhuber, et al., "Binaural Rendering of Ambisonic Signals via Magnitude Least Squares," DAGA 2018, Munich, Mar. 2018, pp. 339-342.

Wang et al., "A Low-complexity Minimum-variance Beamformer Based on Orthogonal Decomposition of the Compounded Subspace", Ultrasonic Imaging, vol. 43, Issue 1, Dec. 23, 2020, pp. 3-18.

Rascon, Caleb, "A Corpus-Based Evaluation of Beamforming Techniques and Phase-Based Frequency Masking", Sensors, vol. 21, Issue 15, Jul. 23, 2021, 19 Pages.

Pessentheiner, Hannes, "Beamforming Using Uniform Circular Arrays for Distant Speech Recognition in Reverberant Environment and Double-Talk Scenarios", Graz University of Technology, Feb. 28, 2012, 112 Pages.

Nakatani et al., "Blind and Neural Network-Guided Convolutional Beamformer for Joint Denoising, Dereverberation, and Source Separation", ICASSP 2021—2021 IEEE International Conference on Acoustics, Speech and Signal Processing (ICASSP), 2021, pp. 6129-6133.

Morata et al., "Extension of Traditional Beamforming Methods to the Continuous-Scan Paradigm", University of California, Jan. 3, 2022, 29 Pages.

Maranda, Brian, "Efficient digital beamforming in the frequency domain ", The Journal of the Acoustical Society of America, vol. 86, Issue 5, Nov. 1989, pp. 1813-1819.

Kassir et al., "A Review of the State of the Art and Future Challenges of Deep Learning-Based Beamforming", IEEE Access, vol. 10, Aug. 1, 2022, p. 80869 - 80882.

Broeck et al., "Time-domain generalized cross correlation phase transform sound source localization for small microphone arrays", 2012 5th European DSP Education and Research Conference (EDERC), Sep. 2012, 06 Pages.

Braun et al., "An informed spatial filter for dereverberation in the spherical harmonic domain", 2013 IEEE International Conference on Acoustics, Speech and Signal Processing, 2013, pp. 669-673.

Braun et al., "Low Complexity Online Convolutional Beamforming", 2021 IEEE Workshop on Applications of Signal Processing to Audio and Acoustics (WASPAA), 2021, 05 Pages.

Ahrens, Jens, "Ambisonic Encoding of Signals From Spherical Microphone Arrays", Chalmers University of Technology, Sep. 18, 2022, 04 Pages.

Ahrens, Jens, "Ambisonic Encoding of Signals From Equatorial Microphone Arrays", Chalmers University of Technology, Sep. 18, 2022, 04 Pages.

* cited by examiner

| SOURCE | ANGLE | TDOA$_{34}$ | TDOA$_{12}$ | TDOA$_{14}$ | TDOA$_{23}$ |
|---|---|---|---|---|---|
| 0 | - | - | - | - | - |
| 1 | 0 | -0.3e-3 | -0.4e-3 | -0.7e-4 | 0.7e-4 |
| 2 | π/4 | -0.2e-3 | -0.3e-3 | -0.5e-4 | 0.5e-4 |
| 3 | π/2 | 0 | 0 | 0.0e-4 | 0.0e-4 |
| 4 | 3π/4 | 0.2e-3 | 0.3e-3 | 0.5e-4 | -0.5e-4 |
| 5 | π | 0.3e-3 | 0.4e-3 | 0.7e-4 | -0.7e-4 |
| 6 | 5π/4 | 0.2e-3 | -0.3e-3 | 0.5e-4 | -0.5e-4 |
| 7 | 3π/2 | 0 | -0.0e-3 | 0.0e-4 | 0.0e-4 |
| 8 | 7π/4 | -0.2e-3 | -0.3e-3 | -0.5e-4 | 0.5e-4 |

METHODS AND APPARATUS TO IMPROVE DETECTION OF AUDIO SIGNATURES

CROSS REFERENCE TO RELATED APPLICATIONS

This patent arises from a continuation of U.S. patent Ser. No. 18/298,178, filed Apr. 10, 2023, which is a continuation of U.S. patent Ser. No. 17/541,020, filed on Dec. 2, 2021, now U.S. Pat. No. 11,656,318, which is a continuation of U.S. patent application Ser. No. 16/455,025, filed on Jun. 27, 2019; now U.S. Pat. No. 11,226,396, each of which is incorporated herein by reference in its entirety.

FIELD OF THE DISCLOSURE

This disclosure relates generally to media monitoring, and, more particularly, to methods and apparatus to improve detection of audio signatures.

BACKGROUND

Monitoring companies desire knowledge on how users interact with media devices, such as smartphones, tablets, laptops, smart televisions, etc. To facilitate such monitoring, monitoring companies enlist panelists and install meters at the media presentation locations of those panelists. The meters monitor media presentations and transmit media monitoring information to a central facility of the monitoring company. Such media monitoring information enables the media monitoring companies to, among other things, monitor exposure to advertisements, determine advertisement effectiveness, determine user behavior, identify purchasing behavior associated with various demographics, etc.

BRIEF DESCRIPTION OF THE DRAWINGS

The figures are not to scale. In general, the same reference numbers will be used throughout the drawing(s) and accompanying written description to refer to the same or like parts.

Figure 1:
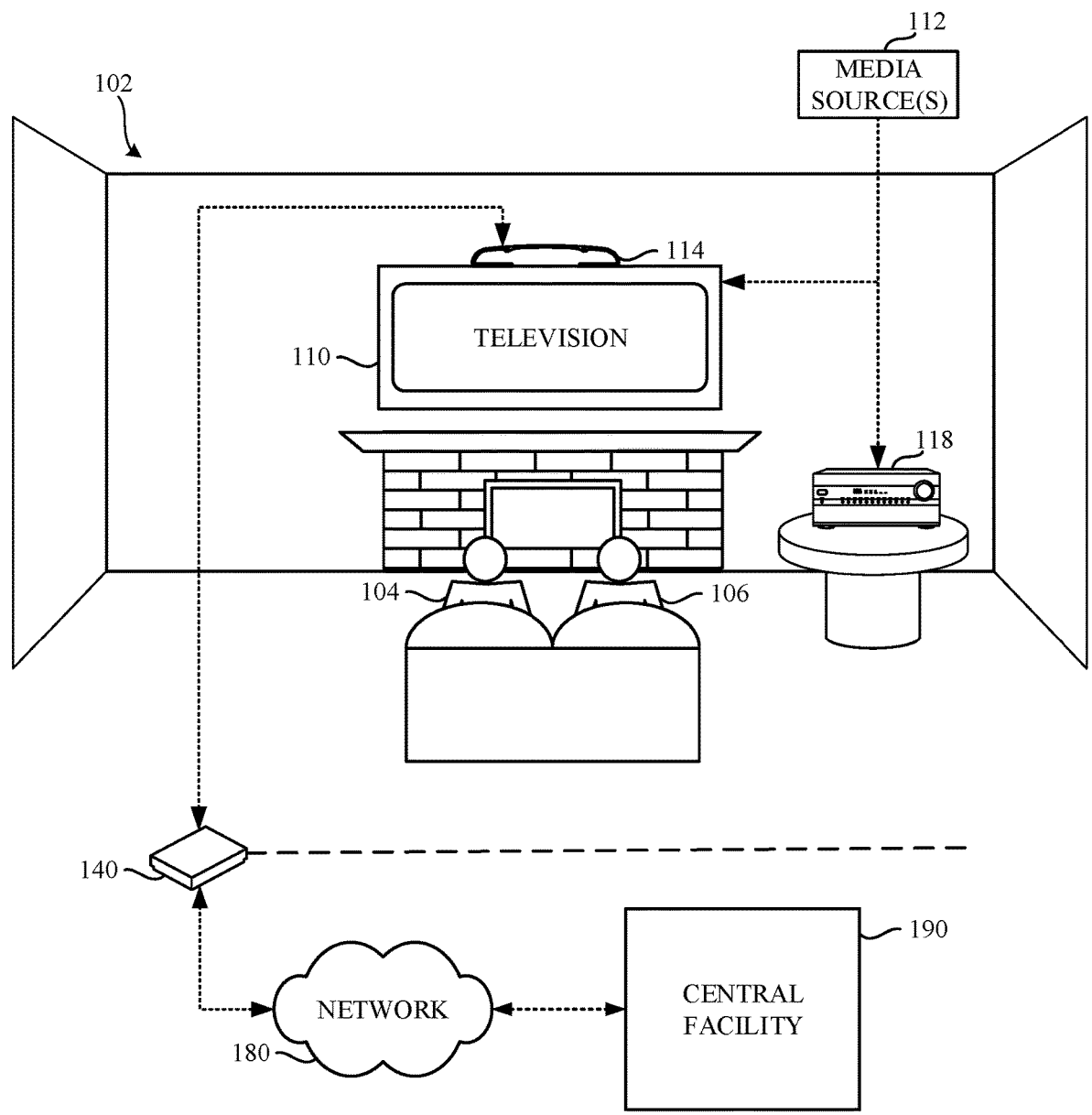
FIG. 1 is a block diagram of an example system constructed in accordance with the teachings of this disclosure to improve detection of audio signatures.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

Fingerprint or signature-based media monitoring techniques generally use one or more inherent characteristics of the monitored media during a monitoring time interval to generate a substantially unique proxy for the media. Such a proxy is referred to as a signature or fingerprint, and can take any form (e.g., a series of digital values, a waveform, etc.) representative of any aspect(s) of the media signal(s) (e.g., the audio and/or video signals forming the media presentation being monitored). A signature can be a series of signatures collected in series over a timer interval. A good signature is repeatable when processing the same media presentation, but is unique relative to other (e.g., different) presentations of other (e.g., different) media. Accordingly, the term "fingerprint" and "signature" are used interchangeably herein and are defined herein to mean a proxy for identifying media that is generated from one or more inherent characteristics of the media.

Signature-based media monitoring generally involves determining (e.g., generating and/or collecting) signature(s) representative of a media signal (e.g., an audio signal and/or a video signal) output by a monitored media device and comparing the monitored signature(s) to one or more references signatures corresponding to known (e.g., reference) media sources. Various comparison criteria, such as a cross-correlation value, a Hamming distance, etc., can be evaluated to determine whether a monitored signature matches a particular reference signature. When a match between the monitored signature and one of the reference signatures is found, the monitored media can be identified as corresponding to the particular reference media represented by the reference signature that matched the monitored signature. Because attributes, such as an identifier of the media, a presentation time, a broadcast channel, etc., are collected for the reference signature, these attributes can then be associated with the monitored media whose monitored signature matched the reference signature. Example systems for identifying media based on codes and/or signatures are long known and were first disclosed in Thomas, U.S. Pat. No. 5,481,294, which is hereby incorporated by reference in its entirety.

Historically, audio fingerprinting technology has used the loudest parts (e.g., the parts with the most energy, etc.) of an audio signal to create fingerprints in a time segment. However, in some cases, this method has several severe limitations. In some examples, the loudest parts of an audio signal can be associated with noise (e.g., unwanted audio) and not from the audio of interest. For example, attempting to fingerprint media from a noisy area (e.g., a room with a group of people watching television), the loudest parts of a captured audio signal can be conversations between the group of people and not the audio signal. In this example, many of the sampled portions of the audio signal would be of the background noise and not of the media, which reduces the usefulness of the generated fingerprint. Accordingly, fingerprints generated using existing methods usually do not include samples in higher frequency ranges.

Example methods and apparatus disclosed herein overcome the above problems by removing audio signals (e.g., audio recordings) from fingerprint processing based on phase differences between transformed audio signals to reduce a computational burden on a processor. Examples disclosed herein remove audio signals based on phase differences between transformed audio, thereby resulting in increased accuracy of identifying media associated with the fingerprint. In addition, examples disclosed herein utilize the transformed audio signals to generate fingerprints. As such, examples disclosed herein utilize peak values of portions of the transformed audio signals which reduces the amount of audio to be processed during the fingerprinting computations (e.g., processor does not need to process the entire audio signal).

As used herein, "virtual source location" and "virtual audio source location" refer to virtual (e.g., computer generated) positions of an audio source generating virtual (e.g., computer generated) audio. That is, a "virtual audio source location" is representative of a computer generated audio source location based on known principles and properties of audio (e.g., speed of sound, etc.). As used herein "media" refers to audio and/or visual (still or moving) content and/or advertisements. In some examples, to identify watermarked media, the watermark(s) are extracted and used to access a table of reference watermarks that are mapped to media identifying information.

FIG. 1 is an illustration of an example audience measurement system constructed in accordance with the teachings of this disclosure to improve detection of audio signatures. In the illustrated example of FIG. 1, an example media presentation environment 102 includes example panelists 104, 106, an example media presentation device 110 that receives media from an example media source 112, and an example meter 114. The meter 114 identifies the media presented by the media presentation device 110 and reports media monitoring information to an example central facility 190 of an example audience measurement entity via an example gateway 140 and an example network 180.

In the illustrated example of FIG. 1, the example media presentation environment 102 is a room of a household (e.g., a room in a home of a panelist, such as the home of a "Nielsen family"). In the illustrated example of FIG. 1, the example panelists 104, 106 of the household have been statistically selected to develop media ratings data (e.g., television ratings data) for a population/demographic of interest. People become panelists via, for example, a user interface presented on a media device (e.g., via the media presentation device 110, via a website, etc.). People become panelists in additional or alternative manners such as, for example, via a telephone interview, by completing an online survey, etc. Additionally or alternatively, people may be contacted and/or enlisted using any desired methodology (e.g., random selection, statistical selection, phone solicitations, Internet advertisements, surveys, advertisements in shopping malls, product packaging, etc.). In some examples, an entire family may be enrolled as a household of panelists. That is, while a mother, a father, a son, and a daughter may each be identified as individual panelists, their viewing activities typically occur within the family's household.

In the illustrated example of FIG. 1, one or more panelists 104, 106 of the household have registered with an audience measurement entity (e.g., by agreeing to be a panelist) and have provided their demographic information to the audience measurement entity as part of a registration process to enable associating demographics with media exposure activities (e.g., television exposure, radio exposure, Internet exposure, etc.). The demographic data includes, for example, age, gender, income level, educational level, marital status, geographic location, race, etc., of a panelist. While the example media presentation environment 102 is a household in the illustrated example of FIG. 1, the example media presentation environment 102 can additionally or alternatively be any other type(s) of environments such as, for example, a theater, a restaurant, a tavern, a retail location, an arena, etc.

In the illustrated example of FIG. 1, the example media presentation device 110 is a television. However, the example media presentation device 110 can correspond to any type of audio, video and/or multimedia presentation device capable of presenting media audibly and/or visually. In the illustrated example of FIG. 1, the media presentation device 110 is in communication with an example audio/video receiver 118. In some examples, the media presentation device 110 (e.g., a television) may communicate audio to another media presentation device (e.g., the audio/video receiver 118) for output by one or more speakers (e.g., surround sound speakers, a sound bar, etc.). As another example, the media presentation device 110 can correspond to a multimedia computer system, a personal digital assistant, a cellular/mobile smartphone, a radio, a home theater system, stored audio and/or video played back from a memory, such as a digital video recorder or a digital versatile disc, a webpage, and/or any other communication device capable of presenting media to an audience (e.g., the panelists 104, 106).

The media presentation device 110 receives media from the media source 112. The media source 112 may be any type of media provider(s), such as, but not limited to, a cable media service provider, a radio frequency (RF) media provider, an Internet based provider (e.g., IPTV), a satellite media service provider, etc., and/or any combination thereof. The media may be radio media, television media, pay per view media, movies, Internet Protocol Television (IPTV), satellite television (TV), Internet radio, satellite radio, digital television, digital radio, stored media (e.g., a compact disk (CD), a Digital Versatile Disk (DVD), a Blu-ray disk, etc.), any other type(s) of broadcast, multicast and/or unicast medium, audio and/or video media presented (e.g., streamed) via the Internet, a video game, targeted broadcast, satellite broadcast, video on demand, etc. For example, the media presentation device 110 can correspond to a television and/or display device that supports the National Television Standards Committee (NTSC) standard, the Phase Alternating Line (PAL) standard, the Séquentiel Couleur a Mémoire (SECAM) standard, a standard developed by the Advanced Television Systems Committee (ATSC), such as high definition television (HDTV), a standard developed by the Digital Video Broadcasting (DVB) Project, etc. Advertising, such as an advertisement and/or a preview of other programming that is or will be offered by the media source 112, etc., is also typically included in the media.

In examples disclosed herein, an audience measurement entity provides the meter 114 to the panelist 104, 106 (or household of panelists) such that the meter 114 may be installed by the panelist 104, 106 by simply powering the meter 114 and placing the meter 114 in the media presentation environment 102 and/or near the media presentation device 110 (e.g., near a television set). In some examples, the meter 114 may be provided to the panelist 104, 106 by an entity other than the audience measurement entity. In some examples, more complex installation activities may be performed such as, for example, affixing the meter 114 to the media presentation device 110, electronically connecting the meter 114 to the media presentation device 110, etc. The example meter 114 detects exposure to media and electronically stores monitoring information (e.g., a code detected with the presented media, a signature of the presented media, an identifier of a panelist present at the time of the presentation, a timestamp of the time of the presentation) of the presented media. The stored monitoring information is then transmitted back to the central facility 190 via the gateway 140 and the network 180. While the media monitoring information is transmitted by electronic transmission in the illustrated example of FIG. 1, the media monitoring information may additionally or alternatively be transferred in any other manner such as, for example, by physically mailing the meter 114, by physically mailing a memory of the meter 114, etc.

The meter 114 of the illustrated example combines audience measurement data and people metering data. For example, audience measurement data is determined by monitoring media output by the media presentation device 110 and/or other media presentation device(s), and audience identification data (also referred to as demographic data, people monitoring data, etc.) is determined from people monitoring data provided to the meter 114. Thus, the example meter 114 provides dual functionality of an audience measurement meter that is to collect audience measurement data, and a people meter that is to collect and/or associate demographic information corresponding to the collected audience measurement data.

For example, the meter 114 of the illustrated example collects media identifying information and/or data (e.g., signature(s), fingerprint(s), code(s), tuned channel identification information, time of exposure information, etc.) and people data (e.g., user identifiers, demographic data associated with audience members, etc.). The media identifying information and the people data can be combined to generate, for example, media exposure data (e.g., ratings data) indicative of amount(s) and/or type(s) of people that were exposed to specific piece(s) of media distributed via the media presentation device 110. To extract media identification data, the meter 114 of the illustrated example of FIG. 1 monitors for signatures (sometimes referred to as fingerprints) included in the presented media.

In examples disclosed herein, to monitor media presented by the media presentation device 110, the meter 114 of the illustrated example senses audio (e.g., acoustic signals or ambient audio) output (e.g., emitted) by the media presentation device 110 and/or some other audio presenting system (e.g., the audio/video receiver 118 of FIG. 1). For example, the meter 114 processes the signals obtained from the media presentation device 110 to detect media and/or source identifying signals (e.g., audio signatures) embedded in portion(s) (e.g., audio portions) of the media presented by the media presentation device 110. To, for example, sense ambient audio output by the media presentation device 110, the meter 114 of the illustrated example includes multiple example audio sensor(s) (e.g., microphone(s) and/or other acoustic sensors). In some examples, the meter 114 may process audio signals obtained from the media presentation device 110 via a direct cable connection to detect media and/or source identifying audio watermarks embedded in such audio signals.

In some examples, the media presentation device 110 utilizes rear-facing speakers. When rear-facing speakers are used, using a forward-facing audio sensor in the meter 114 to receive audio output by the rear-facing speakers does not typically facilitate good recognition of the signatures(s). In contrast, when a rear-facing audio sensor of the meter 114 is used in connection with rear-facing speakers, better recognition of the signatures included in the audio output by the media presentation device can be achieved. In examples disclosed herein, audio recordings from the audio sensor(s) of the meter 114 are utilized to facilitate the best possible signature recognition. For example, when the media presentation device is using rear-facing speakers, audio recordings form the rear-facing audio sensor(s) of the meter 114 may be used; Moreover, different configurations of audio sensor(s) of the meter 114 may be used to, for example, account for different acoustic environments resulting in different recognition levels of signatures, account for differently configured audio systems (e.g., a sound bar system, a 5.1 surround sound system, a 7.1 surround sound system, etc.), or different configurations being used based on a selected input to the media presentation device 110 (e.g., surround sound speakers may be used when presenting a movie, whereas rear-facing speakers may be used when presenting broadcast television, etc.).

In some examples, the meter 114 can be physically coupled to the media presentation device 110, may be configured to capture audio emitted externally by the media presenting device 110 (e.g., free field audio) such that direct physical coupling to an audio output of the media presenting device 110 is not required. For example, the meter 114 of the illustrated example may employ non-invasive monitoring not involving any physical connection to the media presentation device 110 (e.g., via Bluetooth® connection, WIFI® connection, acoustic watermarking, etc.) and/or invasive monitoring involving one or more physical connections to the media presentation device 110 (e.g., via USB connection, a High Definition Media Interface (HDMI) connection, an Ethernet cable connection, etc.). In some examples, invasive monitoring may be used to facilitate a determination of which audio sensor(s) should be used by the meter 114. For example, the meter 114 may be connected to the media presentation device using a Universal Serial Bus (USB) cable such that a speaker configuration of the media presentation device 110 can be identified to the meter 114. Based on this information, the meter 114 may select the appropriate audio sensor(s) best suited for monitoring the audio output by the media presentation device 110. For example, if the media presentation device 110 indicated that front-facing speakers were being used, the meter 114 may select the front-facing audio sensor(s) for monitoring the output audio.

To generate exposure data for the media, identification(s) of media to which the audience is exposed are correlated with people data (e.g., presence information) collected by the meter 114. The meter 114 of the illustrated example collects inputs (e.g., audience identification data) representative of the identities of the audience member(s) (e.g., the panelists 104, 106). In some examples, the meter 114 collects audience identification data by periodically or a-periodically prompting audience members in the media presentation environment 102 to identify themselves as present in the audience. In some examples, the meter 114 responds to predetermined events (e.g., when the media presenting device 110 is turned on, a channel is changed, an infrared control signal is detected, etc.) by prompting the audience member(s) to self-identify. The audience identification data and the exposure data can then be complied with the demographic data collected from audience members such as, for example, the panelists 104, 106 during registration to develop metrics reflecting, for example, the demographic composition of the audience. The demographic data includes, for example, age, gender, income level, educational level, marital status, geographic location, race, etc., of the panelist.

In some examples, the meter 114 may be configured to receive panelist information via an input device such as, for example a remote control, an Apple® iPad®, a cell phone, etc. In such examples, the meter 114 prompts the audience members to indicate their presence by pressing an appropriate input key on the input device. The meter 114 of the illustrated example may also determine times at which to prompt the audience members to enter information to the meter 114. In some examples, the meter 114 of FIG. 1 supports audio signaturing for people monitoring, which enables the meter 114 to detect the presence of a panelist-identifying metering device in the vicinity (e.g., in the media presentation environment 102) of the media presentation device 110. For example, the audio sensor(s) of the meter 114 may be able to sense example audio output (e.g., emitted) by an example panelist-identifying metering device such as, for example, a wristband, a cell phone, etc. that is uniquely associated with a particular panelist. The audio output by the example panelist-identifying metering device may include, for example one or more audio watermarks to facilitate identification of the panelist-identifying metering device and/or the panelist 104 associated with the panelist-identifying metering device.

The meter 114 of the illustrated example communicates with a remotely located central facility 190 of the audience measurement entity. In the illustrated example of FIG. 1, the example meter 114 communicates with the central facility 190 via a gateway 140 and a network 180. The example metering device 114 of FIG. 1 sends media identification data and/or audience identification data to the central facility 190 periodically, a-periodically and/or upon request by the central facility 190.

The example gateway 140 of the illustrated example of FIG. 1 is a router that enables the meter 114 and/or other devices in the media presentation environment (e.g., the media presentation device 110) to communicate with the network 180 (e.g., the Internet.)

In some examples, the example gateway 140 facilitates delivery of media from the media source(s) 112 to the media presentation device 110 via the Internet. In some examples, the example gateway 140 includes gateway functionality such as modem capabilities. In some other examples, the example gateway 140 is implemented in two or more devices (e.g., a router, a modem, a switch, a firewall, etc.). The gateway 140 of the illustrated example may communicate with the network 126 via Ethernet, a digital subscriber line (DSL), a telephone line, a coaxial cable, a USB connection, a Bluetooth connection, any wireless connection, etc.

In some examples, the example gateway 140 hosts a Local Area Network (LAN) for the media presentation environment 102. In the illustrated example, the LAN is a wireless local area network (WLAN), and allows the meter 114, the media presentation device 110, etc. to transmit and/or receive data via the Internet. Alternatively, the gateway 140 may be coupled to such a LAN. In some examples, the example gateway 140 is implemented by a cellular communication system and may, for example, enable the meter 114 to transmit information to the central facility 190 using a cellular connection.

The network 180 of the illustrated example is a wide area network (WAN) such as the Internet. However, in some examples, local networks may additionally or alternatively be used. Moreover, the example network 180 may be implemented using any type of public or private network such as, but not limited to, the Internet, a telephone network, a local area network (LAN), a cable network, and/or a wireless network, or any combination thereof.

The central facility 190 of the illustrated example is implemented by one or more servers. The central facility 190 processes and stores data received from the meter(s) 114. For example, the example central facility 190 of FIG. 1 combines audience identification data and program identification data from multiple households to generate aggregated media monitoring information. The central facility 190 generates a report(s) for advertisers, program producers and/or other interested parties based on the compiled statistical data. Such reports include extrapolations about the size and demographic composition of audiences of content, channels and/or advertisements based on the demographics and behavior of the monitored panelists.

As noted above, the meter 114 of the illustrated example provides a combination of media metering and people metering. The meter 114 of FIG. 1 includes its own housing, processor, memory and/or software to perform the desired media monitoring and/or people monitoring functions. The example meter 114 of FIG. 1 is a stationary device disposed on or near the media presentation device 110. To identify and/or confirm the presence of a panelist present in the media presentation environment 102, the example meter 114 of the illustrated example includes a display. For example, the display provides identification of the panelists 104, 106 present in the media presentation environment 102. For example, in the illustrated example, the meter 114 displays indicia (e.g., illuminated numerical numerals 1, 2, 3, etc.) identifying and/or confirming the presence of the first panelist 104, the second panelist 106, etc. In the illustrated example, the meter 114 is affixed to a top of the media presentation device 110. However, the meter 114 may be affixed to the media presentation device in any other orientation such as, for example, on a side of the media presentation device 110, on the bottom of the media presentation device 110, and/or may not be affixed to the media presentation device 110. For example, the meter 114 may be placed in a location near the media presentation device 110.

Figure 2:
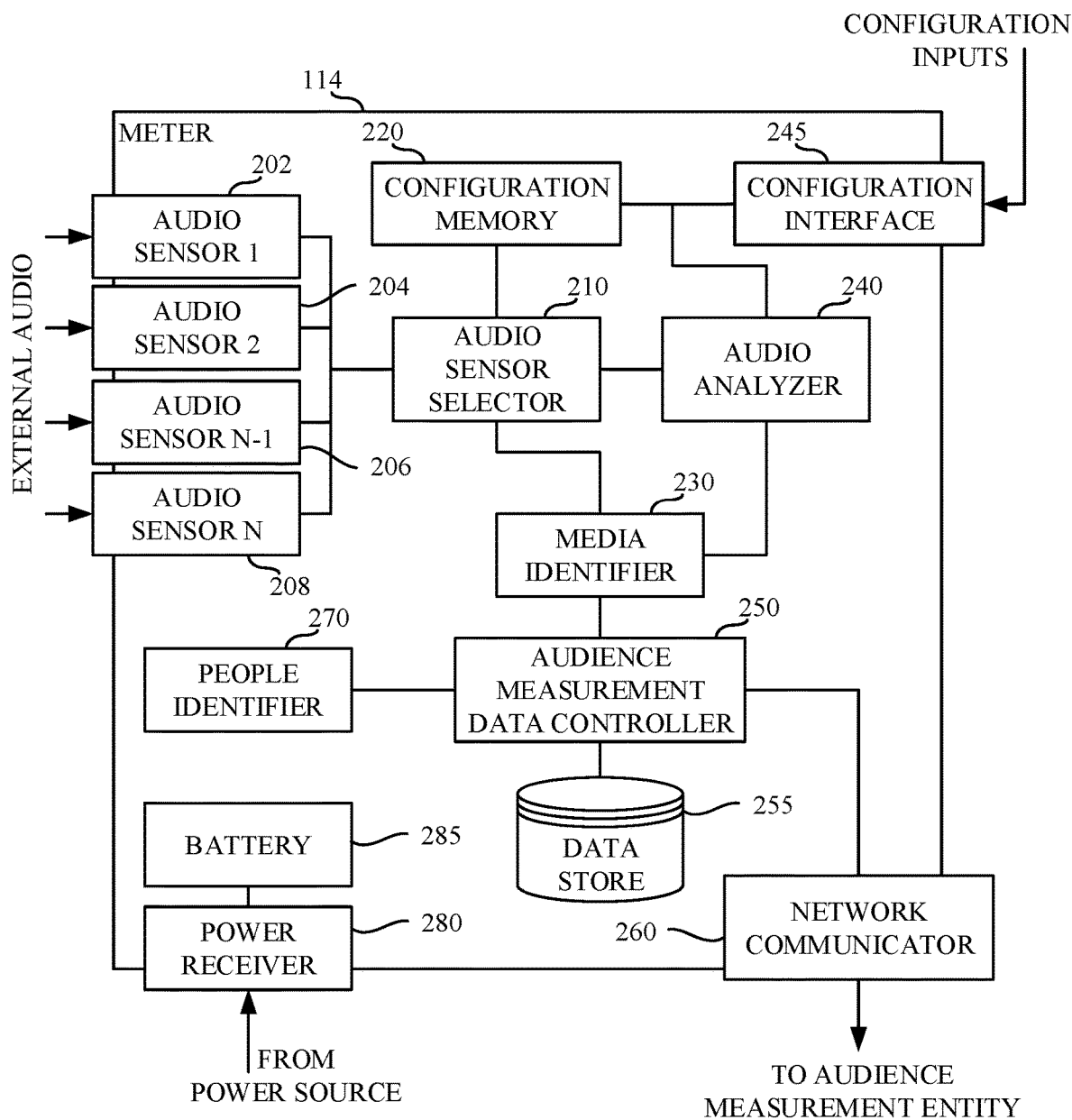
FIG. 2 is a block diagram of the example meter of FIG. 1.

FIG. 2 is a block diagram illustrating an example implementation of the example meter 114 of FIG. 1. The example meter 114 of FIG. 2 includes example audio sensors 202, 204, 206, 208, an example audio sensor selector 210, an example configuration memory 220, an example media identifier 230, an example audio analyzer 240, an example configuration interface, 245, an example audience measurement data controller 250, an example data store 255, an example network communicator 260, an example people identifier 270, an example power receiver 280, and an example battery 285.

The example audio sensors 202, 204, 206, 208 of the illustrated example of FIG. 2 are implemented by microphones and/or other acoustic sensors. The example audio sensors 202, 204, 206, 208 each receive ambient sound (e.g., free field audio) including audible media presented in the vicinity of the meter 114. Alternatively, one or more of the audio sensor(s) 202, 204, 206, 208 may be implemented by a line input connection. The line input connection may allow one or more external microphone(s) to be used with the meter 114 and/or, in some examples, may enable one or more of the audio sensor 202, 204, 206, 208 to be directly connected to an output of a media presentation device (e.g., an auxiliary output of a television, an auxiliary output of an audio/video receiver of a home entertainment system, etc.) Advantageously, the meter 114 is positioned in a location such that the audio sensor 202, 204, 206, 208 receives ambient audio produced by the television and/or other devices of the home entertainment system with sufficient quality to identify media presented by the media presentation device 110 and/or other devices of the media presentation environment 102 (e.g., the audio/video receiver 118). For example, in examples disclosed herein, the meter 120 may be placed on top of the television, secured to the bottom of the television, etc.

In the illustrated example of FIG. 2, four audio sensors 202, 204, 206, 208 are shown. Each of the four audio sensors 202, 204, 206, 208 corresponds to a front-right microphone, a front-left microphone, a rear-right microphone, and a rear-left microphone, respectively. While four audio sensors are used in the illustrated example of FIG. 2, any number of audio sensors may additionally or alternatively be used. Example placements of the example audio sensors 202, 204, 206, 208 on the meter 114 are shown below in the illustrated examples of FIGS. 4, 5, and/or 6.

The example audio sensor selector 210 of the illustrated example of FIG. 2 combines audio received by the audio sensors 202, 204, 206, 208 to prepare a combined audio signal for analysis by the media identifier 230. In some examples, the example audio sensor selector 210 combines the audio received by the audio sensor 202, 204, 206, 208 by mixing the audio. In examples disclosed herein, the example audio sensor selector 210 consults the example configuration memory 220 to identify which audio sensors 202, 204, 206, 208 should have their respective received audio signals passed through to the media identifier 230. Conversely, in some examples, the example audio sensor selector 210 may identify which audio sensors 202, 204, 206, 208 should not be passed (e.g., should be blocked), and blocks those audio sensor(s) 202, 204, 206, 208 accordingly. In some examples, the audio sensor selector 210 consults with the audio analyzer 240 to identify which audio sensors 202, 204, 206, 208 should have their respective audio signals passed through to the media identifier 230.

The example configuration memory 220 of the illustrated example of FIG. 2 stores an audio sensor configuration identifying which of the audio sensors 202, 204, 206, 208 should be selected by the audio sensor selector 210 to form the audio signal to be processed by the media identifier 230. However, any other additional configuration and/or operational information may additionally or alternatively be stored. For example, WiFi credentials to be used by the network communicator 260, panelist and/or household identifier(s), etc. may be stored in the configuration memory 220. The example configuration memory 220 may be updated by, for example, the configuration interface 245 and/or the audio analyzer 240. The example configuration memory 220 of the illustrated example of FIG. 2 may be implemented by any device for storing data such as, for example, flash memory, magnetic media, optical media, etc. Furthermore, the data stored in the example configuration memory 220 may be in any data format such as, for example, binary data, comma delimited data, tab delimited data, structured query language (SQL) structures, etc.

The example media identifier 230 of the illustrated example of FIG. 2 analyzes audio received via one or more of the audio sensor(s) 202, 204, 206, 208 and identifies the media being presented. The example media identifier 230 of the illustrated example outputs an identifier of the media (e.g., media-identifying information) to the audience measurement data controller 250. In the illustrated example of FIG. 2, the example media identifier 230 outputs a quality metric of the media identifier. As used herein, a quality metric is defined to be any value representative of a strength and/or quality of a detected signature/fingerprint. In examples disclosed herein, the quality metric may be a score, a bit error rate (BER), a volume level, etc. Moreover, in some examples, different values representative of the strength and/or quality of the detected signature/fingerprint may be combined to form the quality metric.

In some examples, the media identifier 230 may utilize signature-based media identification techniques. Unlike media monitoring techniques based on codes and/or watermarks included with and/or embedded in the monitored media, fingerprint or signature-based media monitoring techniques generally use one or more inherent characteristics of the monitored media during a monitoring time interval to generate a substantially unique proxy for the media. Such a proxy is referred to as a signature or fingerprint, and can take any form (e.g., a series of digital values, a waveform, etc.) representative of any aspect(s) of the media signal(s) (e.g., the audio and/or video signals forming the media presentation being monitored). A signature may be a series of signatures collected in series over a time interval. A good signature is repeatable when processing the same media presentation, but is unique relative to other (e.g., different) presentations of other (e.g., different) media. Accordingly, the term "fingerprint" and "signature" are used interchangeably herein and are defined herein to mean a proxy for identifying media that is generated from one or more inherent characteristics of the media.

Signature-based media monitoring generally involves determining (e.g., generating and/or collecting) signature(s) representative of a media signal (e.g., an audio signal and/or a video signal) output by a monitored media device and comparing the monitored signature(s) to one or more references signatures corresponding to known (e.g., reference) media sources. Various comparison criteria, such as a cross-correlation value, a Hamming distance, etc., can be evaluated to determine whether a monitored signature matches a particular reference signature. When a match between the monitored signature and one of the reference signatures is found, the monitored media can be identified as corresponding to the particular reference media represented by the reference signature that matched the monitored signature. Because attributes, such as an identifier of the media, a presentation time, a broadcast channel, etc., are collected for the reference signature, these attributes may then be associated with the monitored media whose monitored signature matched the reference signature. Example systems for identifying media based on codes and/or signatures are long known and were first disclosed in Thomas, U.S. Pat. No. 5,481,294, which is hereby incorporated by reference in its entirety. In some examples, the media identifier 230 analyzes peak values of a transformed audio signal from one or more of the audio sensors 202, 204, 206, 208 as identified by the audio sensor selector 210. For example, the audio sensor selector 210 may identify that audio recordings from the first and second audio sensors 202, 204 are to be analyzed. As such, the media identifier 230 may perform fingerprinting techniques on peak values of the transformed audio recordings to reduce a computational burden on a processor, as discussed in more detail below.

Figure 3:
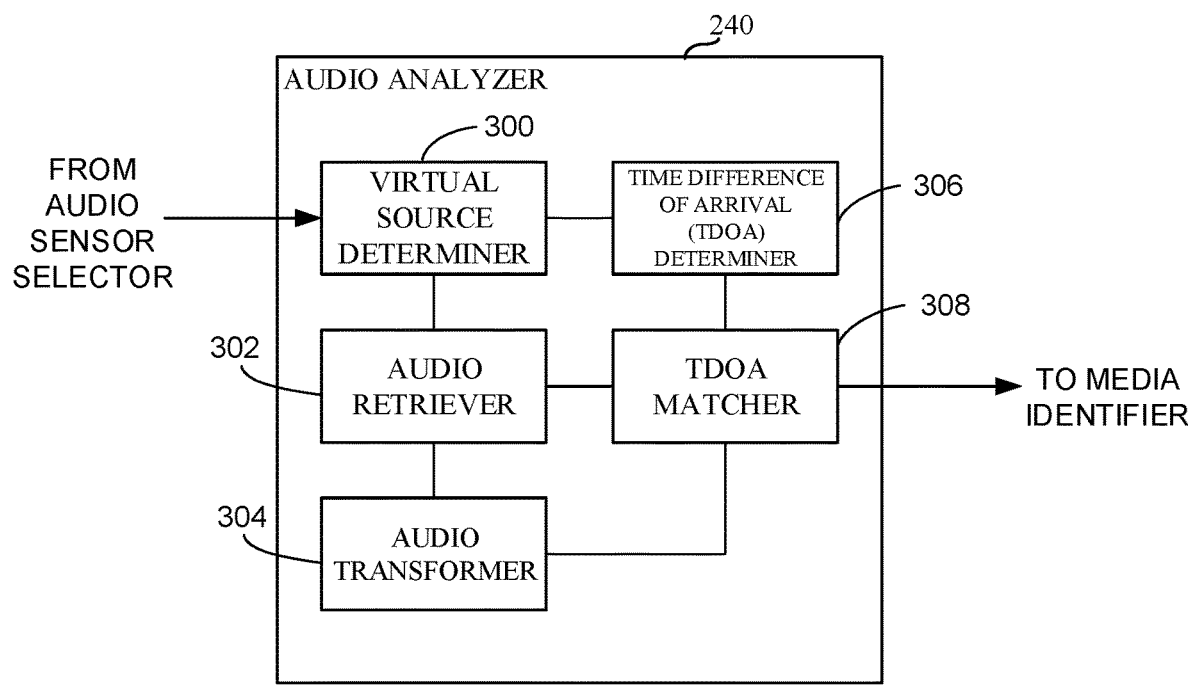
FIG. 3 is a block diagram of the audio analyzer of FIG. 2.

Turning to FIG. 3, the example audio analyzer 240 includes an example virtual source determiner 300, an example audio retriever 302, an example audio transformer 304, an example time difference of arrival (TDOA) determiner 306, and an example TDOA matcher 308. The example virtual source determiner 300 analyzes the configuration (e.g., positioning of audio sensors on or within the meter 114) of the audio sensors 202, 204, 206, 208. For example, the virtual source determiner 300 identifies the configuration of the audio sensors 202, 204, 206, 208 and radially positions 8 virtual audio sources at different angles around the meter 114. In some examples, the virtual sources may be positioned at different distances from the meter 114. For example, a first virtual source is virtually positioned three feet from the meter, while a second virtual source is virtually positioned five feet from the meter 114. In some examples, the virtual sources may be positioned at different angles and different positions (e.g., a first virtual source positioned a first distance at a first angle from the meter 114, a second virtual source positioned a second distance at a second angle from the meter 114, etc.) While 8 virtual audio sources are described in examples disclosed herein, any number of virtual sources may be utilized (e.g., 9, 15, 30, etc.). The example virtual source determiner 300 generates a chart to identify a virtual source, an angle the virtual source is radially positioned about the meter 114, a TDOA between the first audio sensor 202 and the second audio sensor 204, a TDOA between the third audio sensor 206 and the fourth audio sensor 208, a TDOA between the second audio sensor 204 and the fourth audio sensor 208, and a TDOA between the first audio sensor 202 and the third audio sensor 206. In some examples, the virtual source determiner 300 generates the chart to include a distance between the virtual sources and the meter 114 when the virtual sources are positioned at different distances from the meter 114. The chart generated by the virtual source determiner 300 is described in more detail below in connection with FIGS. 7 and 8. In some examples, the virtual source determiner 300 can determine TDOAs for one audio sensor. For example, the virtual source determiner 300 can determine TDOAs between the first audio sensor 202 and the second audio sensor 204, the first audio sensor 202 and the third audio sensor 206, and the first audio sensor 202 and the fourth audio sensor 208.

The audio retriever 302 retrieves audio recordings from the audio sensors 202, 204, 206, 208, and/or from the data store 255. In some examples, the audio retriever 302 can retrieve a first audio recording generated by the first audio sensor 202, a second audio recording generated by the second audio sensor 204, and a third audio recording generated by the third audio sensor 206. While the illustrated example is described with reference to only four audio recordings and audios sensors, any number of audio recordings and/or sensors may be utilized. For example, the audio retriever 302 can obtain a plurality of audio recordings for the first audio sensor 202, the second audio sensor 204, the third audio sensor 206, and the fourth audio sensor 208.

The example audio transformer 304 transforms an audio signal into time-frequency bins and/or audio signal frequency components. For example, the audio transformer 304 can perform a short-time Fourier transform on an audio signal to transform the audio signal into the frequency domain. Additionally, the example audio transformer 304 can divide the transformed audio signal into two or more frequency bins (e.g., using a Hamming function, a Hann function, etc.). Additionally or alternatively, the audio transformer 304 can aggregate the audio signal into one or more periods of time (e.g., the duration of the audio, six second segments, 1 second segments, etc.). In other examples, the audio transformer 304 can use any suitable technique to transform the audio signal (e.g., a Fourier transform, discrete Fourier transforms, a sliding time window Fourier transform, a wavelet transform, a discrete Hadamard transform, a discrete Walsh Hadamard, a discrete cosine transform, etc.). In some examples, the example audio transformer 304 processes the first audio recording using a short-time Fourier transform to obtain a first audio transform with first time-frequency bins, the second audio recording using the short-time Fourier transform to obtain a second audio transform with second time-frequency bins, and the third audio recording using the short-time Fourier transform to obtain a third audio transform with third time-frequency bins.

To calibrate the meter 114, the example TDOA determiner 306 determines a time difference of arrival between a time it takes a virtual audio signal to reach a first audio sensor and a time it takes the same virtual audio signal to reach a second audio sensor when the virtual audio source is coming from a virtual source location. For example, the TDOA determiner 306 calculates a first time for a first virtual signal coming from a virtual source to reach the first audio sensor 202 based on a distance and/or an angle and the speed of sound. In some examples, the TDOA determiner 306 calculates a second time for the first virtual signal coming from the virtual source to reach the second audio sensor 204 based on a distance and/or an angle and the speed of sound. In some examples, the TDOA determiner 306 determines the first virtual source time difference of arrival based on a difference between the first time and the second time. The TDOA determiner 306 completes this process for the remaining audio sensor pairs and source locations, as discussed in more detail below in connection with FIGS. 7 and 8. The results from the TDOA determiner 306 may be stored in the data store 255, configuration memory 220, and/or transmitted to the TDOA matcher 308 for further processing.

To determine a time difference of arrival for audio recordings from the audio sensors 202, 204, 206, 206, the TDOA determiner 306 determines the audio characteristics of a portion of the audio signal (e.g., an audio signal frequency component, an audio region surrounding a time-frequency bin, etc.). For example, the TDOA determiner 306 can determine a phase value of a time-frequency bin of one or more of the audio signal frequency component(s) from audio recordings generated by the audio sensors 202, 204, 206, 208. In some examples, the TDOA determiner 306 determines a first phase value from a first audio recording from the first audio sensor 202, and identifies the first phase value in a second audio recording from the second audio sensor 204. Further, in this example, the TDOA determiner 306 can determine the time difference of arrival between the first phase value from the first audio recording and the first phase value in the second audio recording to determine the TDOA between the first audio sensor 202 and the second audio sensor 204 (e.g., $TDOA_{12}$). In some examples, the example TDOA determiner 306 calculates inter-channel time differences for the transformed audio from the audio transformer 304. For example, the TDOA determiner 306 calculates a first inter-channel time difference between phase values of a first transform corresponding to the first audio sensor 202 and phase values of a second transform corresponding to the second audio sensor 204. In such an example, the first inter-channel time difference is representative of the first time difference of arrival. The TDOA determiner 306 calculates a second inter-channel time difference between the phase values of the first transform and phase values of a third transform corresponding to the third audio sensor 206. In the illustrated example, the second inter-channel time difference is representative of the second time difference of arrival. The TDOA determiner 306 completes this process for all the audio recordings and audio sensor configurations. The TDOA determiner 306 transmits all the virtual TDOA values and all the TDOA values from the audio recordings to the TDOA matcher 308.

The example TDOA matcher 308 matches the inter-channel time differences (e.g., the difference in phase values) between the audio recordings and compares them to the virtual source time differences, as discussed in more detail below in connection with FIGS. 7 and 8. For example, the TDOA matcher 308 determines a Euclidian distance between the TDOA's from the audio recordings to the TDOA's of the virtual source locations. In some examples, the TDOA matcher 308 determines that audio is being produced by a presentation device from two virtual sources (out of eight in this example). In some examples, one of the sources may be individuals who are watching a presentation device (e.g., a television) that is producing audio from the other source. As such, the TDOA matcher 308 may identify that audio recordings from audio sensors 202, 204 should be removed from further processing because they are producing background noise that negatively effects the audio of the media being presented. In some examples, the TDOA matcher 308 clusters the time-frequency bins that correspond to the virtual source (e.g., virtual source 6) that was identified by matching the inter-channel time differences to the virtual TDOAs into their own representation to extract an estimated spatial source. In some examples, the estimated spatial source is utilized by the media identifier 230 and/or the central facility 190 to compute a fingerprint that is less noisy. The TDOA matcher 308 can transfer the results to the media identifier 230, and the media identifier 230 further analyzes the first and third audio recordings to determine media presented by the media presentation device, for example. The results from the audio analyzer 240 are transmitted to the media identifier 230 for further processing.

Turning back to FIG. 2, the example configuration interface 245 of the illustrated example of FIG. 2 receives configuration inputs from a user and/or installer of the meter 114. In some examples, the configuration interface 245 enables the user and/or the installer to indicate the audio sensor configuration to be stored in the configuration memory 220 and be used by the audio sensor selector 210. In some examples, the configuration interface 245 enables the user and/or the installer to control other operational parameters of the meter 114 such as, for example, WiFi credentials to be used by the network communicator 260, set a household and/or panelist identifier(s), etc. In the illustrated example of FIG. 2, the configuration interface 245 is implemented by a Bluetooth Low Energy radio. However, the configuration interface 245 may be implemented in any other fashion such as, for example, an infrared input, a universal serial bus (USB) connection, a serial connection, an Ethernet connection, etc. In some examples, the configuration interface 245 enables the meter 114 to be communicatively coupled to a media device such as, for example, the media presentation device 110. Such a communicative coupling enables the configuration interface 245 to, for example, detect an audio configuration of the media presentation device 110 such that the configuration memory 220 may be updated to select the audio sensor(s) 202, 204, 206, 208 corresponding to the selected audio configuration of the media presentation device 110. For example, if the media presentation device were using rear-facing speakers, the audio sensor(s) corresponding to rear-facing microphones may be identified in the configuration memory 220.

The example audience measurement data controller 250 of the illustrated example of FIG. 2 receives media identifying information (e.g., a code, a signature, etc.) from the media identifier 230 and audience identification data from the people identifier 270, and stores the received information in the data store 255. The example audience measurement data controller 250 periodically and/or a-periodically transmits, via the network communicator 260, the audience measurement information stored in the data store 255 to the central facility 190 for aggregation and/or preparation of media monitoring reports.

The example data store 255 of the illustrated example of FIG. 2 may be implemented by any device for storing data such as, for example, flash memory, magnetic media, optical media, etc. Furthermore, the data stored in the example data store 255 may be in any data format such as, for example, binary data, comma delimited data, tab delimited data, structured query language (SQL) structures, etc. In the illustrated example, the example data store 255 stores media identifying information collected by the media identifier 230 and audience identification data collected by the people identifier 270. In some examples, the example data store 255 additionally stores panelist demographic information such that received user identifiers of the audience measurement data can be translated into demographic information prior to transmission to the central facility 190.

The example people identifier 270 of the illustrated example of FIG. 2 determines audience identification data representative of the identities of the audience member(s) (e.g., panelists) present in the media presentation environment 102. In some examples, the people identifier 270 collects audience identification data by periodically or a-periodically prompting audience members in the media presentation environment 102 to identify themselves as present in the audience. Panelists may identify themselves by, for example, pressing a button on a remote, speaking their name, etc. In some examples, the people identifier 270 prompts the audience member(s) to self-identify in response to one or more predetermined events (e.g., when the media presentation device 110 is turned on, a channel is changed, an infrared control signal is detected, etc.). The people identifier 270 provides the audience identification data to the audience measurement data controller such that the audience measurement data can be correlated with the media identification data to facilitate an identification of which media was presented to which audience member.

The example network communicator 260 of the illustrated example of FIG. 2 transmits audience measurement information provided by the audience measurement data controller 250 (e.g., data stored in the data store 255) to the central facility 190 of the audience measurement entity. In the illustrated example, the network communicator 260 is implemented by WiFi antenna that communicates with a WiFi network hosted by the example gateway 140 of FIG. 1. However, in some examples, the network communicator may additionally or alternatively be implemented by an Ethernet port that communicates via an Ethernet network (e.g., a local area network (LAN)). While the example meter 114 communicates data to the central facility 190 via the example gateway 140 in the illustrated example of FIG. 1, data may be transmitted to the central facility 190 in any other fashion. For example, the network communicator 260 may be implemented by a cellular radio, and the example gateway 140 may be a cellular base station. In some examples, the example gateway 140 may be omitted and the example network communicator 260 may transmit data directly to the central facility 190.

The example power receiver 280 of the illustrated example of FIG. 2 is implemented as a universal serial bus (USB) receptacle and enables the meter 114 to be connected to a power source via a cable (e.g., a USB cable). In examples disclosed herein, the media presentation device 110 has a USB port that provides electrical power to, for example, an external device such as the meter 114. In some examples, the media presentation device 110 may provide power to an external device via a different type of port such as, for example, a High Definition Media Interface (HDMI) port, an Ethernet port, etc. The example power receiver 280 may be implemented in any fashion to facilitate receipt of electrical power from the media presentation device 110 or any other power source (e.g., a wall outlet). In some examples, the power receiver 280 may additionally or alternatively facilitate diagnostic communications with the media presentation device 110. For example, the configuration interface 245 may communicate with the media presentation device 110 via the connection provided by the power receiver 280 (e.g., a USB port) to, for example, determine whether the media presentation device 110 is powered on, determine which input is being presented via the media presentation device 110, determine which speakers are being used by the media presentation device 110. In some examples, the connection is an HDMI connection, and the configuration interface 245 communicates with the media presentation device 110 using an HDMI Consumer Electronics Control (CEC) protocol.

The example battery 285 of the illustrated example of FIG. 2 stores power for use by the meter 114. The example battery 285 enables operation of the meter 114 when power is not being supplied to the meter 114 via the power receiver 280. In the illustrated example of FIG. 2, the example battery is implemented using a lithium-ion battery. However, any other type of battery may additionally or alternatively be used. In the illustrated example of FIG. 2, the example battery 285 is rechargeable. As such, the example battery 285 may be recharged while the meter 114 receives power via the power receiver 280 (e.g., while the media presentation device 110 is powered on), to facilitate operation of the meter 114 when the meter 114 is not receiving power via the power receiver 280 (e.g., while the media presentation device 110 is powered off). However, in some examples, the example battery 285 may be non-rechargeable.

Figure 4:
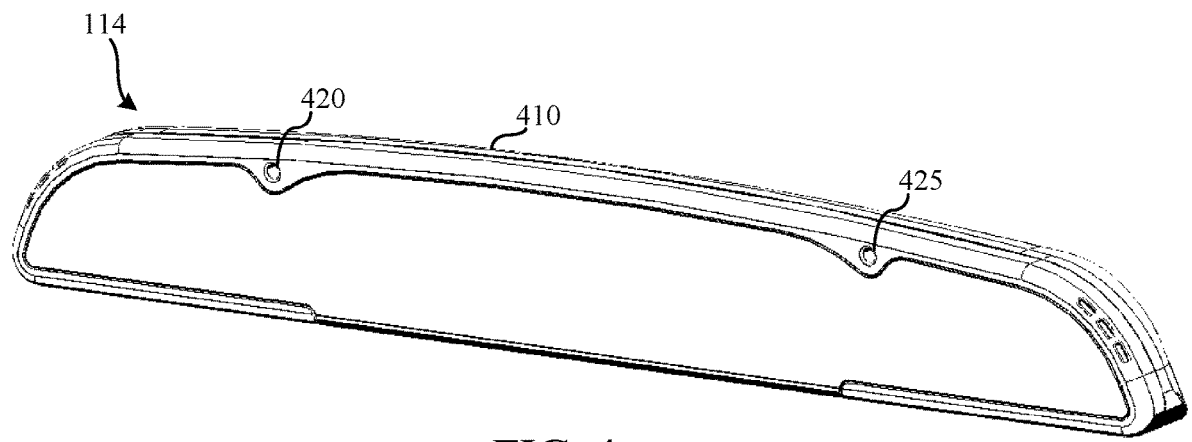
FIG. 4 is an example front view of the example meter of FIGS. 1 and/or 2.

FIG. 4 is an example front view of the example meter 114 of FIGS. 1 and/or 2. In the illustrated example of FIG. 4, the example meter 114 includes a housing 410. In examples disclosed herein, the housing 410 is to be affixed to the media presentation device 110. For example, the housing 410 may be affixed to a top of the media presentation device 110, may be affixed to a bottom of the media presentation device 110, may be affixed to a side of the media presentation device 110, etc. In some examples, the housing 410 of the meter 114 is not affixed to the media presentation device 110. For example, the housing 410 may be placed in any other location within the media presentation environment 102 such that audio may be received by the meter 114.

In the illustrated example of FIG. 4, the example housing 410 includes an example front left opening 420 and an example front right opening 425. The front openings 420, 425 enable free-field audio in front of the housing to be received by the example audio sensors 202, 204, 206, 208, that are positioned towards the front of the meter 114. In the illustrated example of FIG. 4, the front openings 420, 425 are symmetrically aligned on the face of the meter 114. However, the front openings 420, 425 may be arranged in any other fashion. Moreover, while two front openings 420, 425 are shown in the illustrated example of FIG. 4, any other number of openings may additionally or alternatively be used. For example, there may be three openings on the front face of the housing 410, there may be four openings on the front face of the housing 410, etc.

Figure 5:
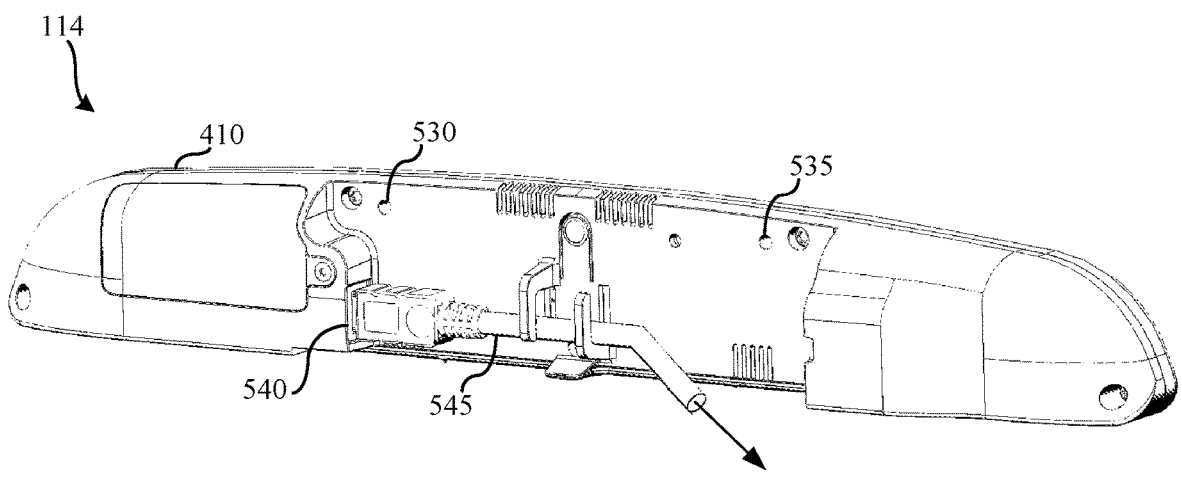
FIG. 5 is an example rear view of the example meter of FIGS. 1 and/or 2.

FIG. 5 is an example rear view of the example meter 114 of FIGS. 1 and/or 2. In the illustrated example of FIG. 5, the example housing 410 includes an example rear left opening 530 and an example rear right opening 535. The rear openings 530, 535 enable free field audio in the rear of the housing 410 to be received by the example audio sensors 202, 204, 206, 208, that are positioned towards the rear of the meter 114. In the illustrated example of FIG. 5, the rear openings 530, 535 are symmetrically aligned on the rear of the meter 114. However, the rear openings 530, 535 may be arranged in any other fashion. Moreover, two rear openings 530, 535 are shown while in the illustrated example of FIG. 5, any other number of openings may additionally or alternatively be used.

In the illustrated example of FIG. 5, the housing 410 includes a USB port 540. In the illustrated example of FIG. 5, the USB port 540 enables a USB cable 545 to connect the power receiver 280 of FIG. 2 to an external power source (e.g., a power source provided by the media presentation device 110). However, any other type(s) and/or number(s) of ports, cables, power source(s), etc. may additionally or alternatively be used.

Figure 6:
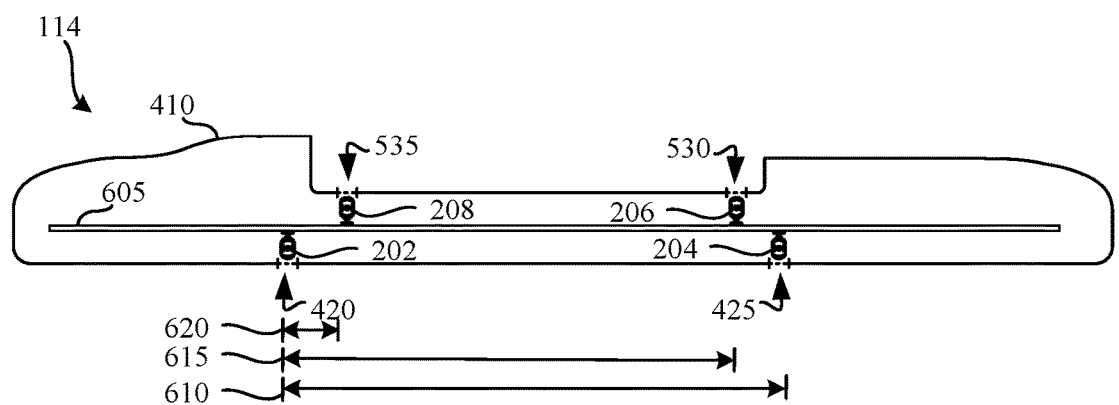
FIG. 6 is an example top view of the example meter of FIGS. 1 and/or 2.

FIG. 6 is an example top view of the example meter 114 of FIGS. 1 and/or 2. In the illustrated example of FIG. 6, the front openings 420, 425 and the rear openings 530, 535 are shown along an outline of the housing 410. Inside the housing 410, an example circuit board 605 (e.g., a circuit board that carries the example components of the example meter 114 of FIG. 2) is shown. In the illustrated example FIG. 6, a single circuit board 605 is shown. However, the example meter 114 may include multiple circuit boards such that components may be positioned to more effectively utilize the space available within the housing 410.

In the illustrated example of FIG. 6, the first audio sensor 202 is connected to the circuit board 605, and is positioned adjacent to the front left opening 420. The second audio sensor 204 is connected to the circuit board 605, and is positioned adjacent to the front right opening 425. The third audio sensor 206 is connected to the circuit board 605, and is positioned adjacent to the rear left opening 530. The fourth audio sensor 208 is connected to the circuit board 605, and is positioned adjacent to the rear right opening 535. As a result, free field audio that is passed through the openings 420, 425, 530, 535 of the housing 410 is picked up by the respective audio sensor 202, 204, 206, 208.

In the illustrated example of FIG. 6, the first audio sensor 202 is connected to the circuit board 605, and is positioned adjacent to the front left opening 420. In the illustrated example, the second audio sensor 204 is connected to the circuit board 605, and is positioned a first distance 610 from the first audio sensor 202. In the illustrated example, the third audio sensor 206 is connected to the circuit board 605, and is positioned a second distance 615 from the first audio sensor 202. In the illustrated example, the fourth audio sensor 208 is connected to the circuit board 605, and is positioned a third distance 620 from the first audio sensor 202. However, the audio sensors 202, 204, 206, 208 can be configured in any alternative configuration other than the configuration illustrated in FIG. 6.

Figure 7:
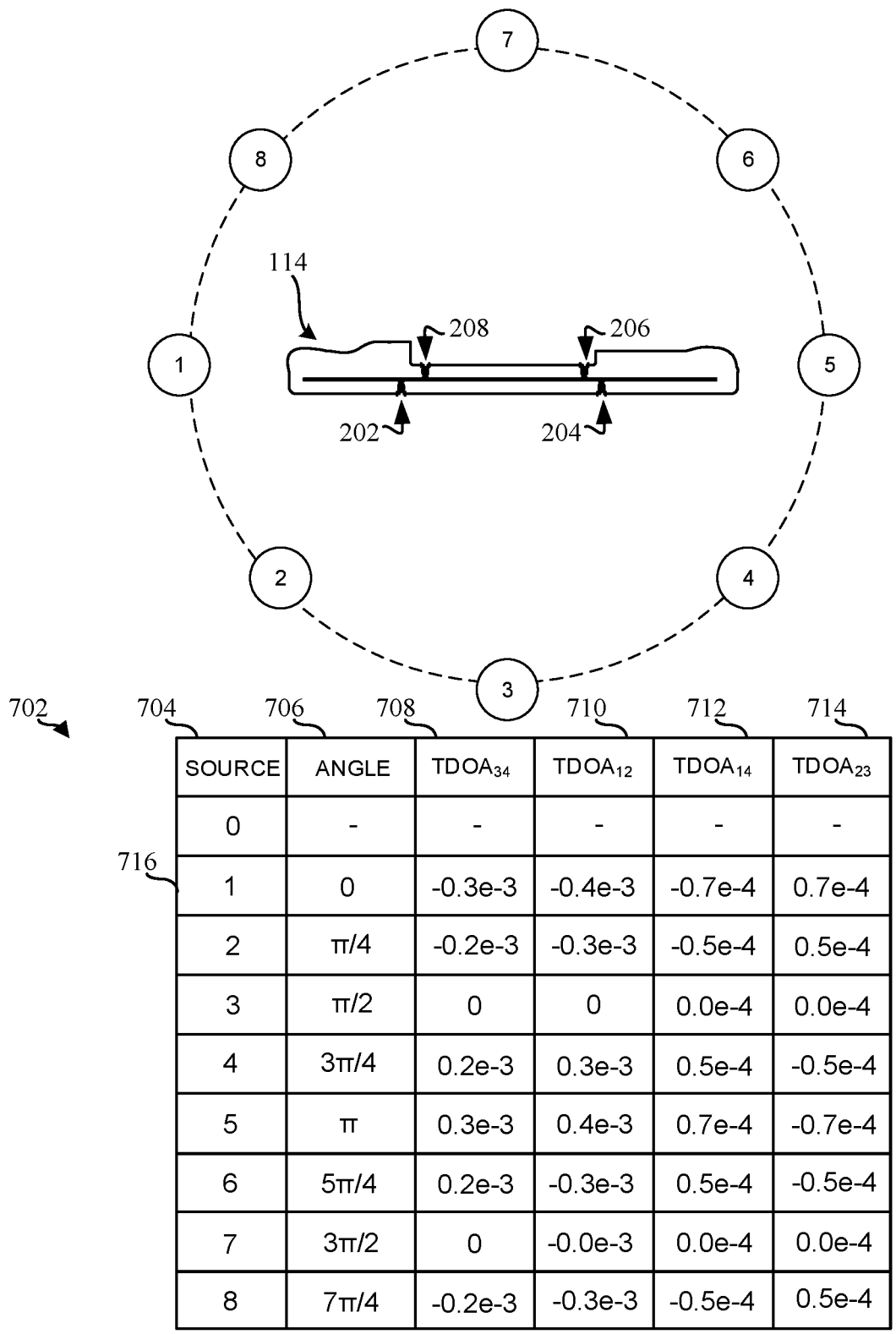
FIG. 7 is a diagram representing an example virtual audio source environment to calibrate the meter of FIGS. 1 and/or 2.

FIG. 7 illustrates an example virtual source location environment 700 which may be used to implement examples disclosed herein. In the illustrated example, the virtual source location environment 700 includes the example meter 114 including the audio sensors 202, 204, 206, 208, and virtual source locations 1-8. To determine the virtual source location environment 700, the example virtual source determiner 300 analyzes the configuration (e.g., positioning of audio sensors on or within the meter 114) of the audio sensors 202, 204, 206, 208. For example, the virtual source determiner 300 identifies the configuration of the audio sensors 202, 204, 206, 208 and radially positions 8 virtual audio sources at different angles around the meter 114. While 8 virtual audio sources are described in examples disclosed herein, any number of virtual sources may be utilized (e.g., 9, 15, 30, etc.).

In the illustrated example, the virtual source determiner 300 generates a chart 702 including a first column 704 to identify the virtual source, a second column 706 to identify the angle the virtual source is radially positioned about the meter 114, a third column 708 to identify the TDOA between the first audio sensor 202 and the second audio sensor 204, a fourth column 710 to identify the TDOA between the third audio sensor 206 and the fourth audio sensor 208, a fifth column 712 to identify the TDOA between the second audio sensor 204 and the fourth audio sensor 208, and a sixth column 714 to identify the TDOA between the first audio sensor 202 and the third audio sensor 206. In the illustrated example, the virtual source determiner 300 populates the first and second columns 704, 706.

To populate the remainder of the chart 702 (e.g., columns 708-714), the TDOA determiner 306 determines the time difference of arrival between a time it takes a virtual audio signal to reach a first audio sensor and a time it takes the same virtual audio signal to reach a second audio sensor when the virtual audio source is coming from a virtual source location. For example, the TDOA determiner 306 calculates 1) a first time for a first virtual signal coming from the virtual source 1 to reach the first audio sensor 202 based on a distance and/or the angle in the second column 706 of the virtual source 1 from the first audio sensor 202 and the speed of sound. In some example, the TDOA determiner 306 calculates a second time for the first virtual signal coming from the virtual source 1 to reach the second audio sensor 204 based on a distance and/or the angle in the second column 706 of the virtual source 1 from the second audio sensor 204 and the speed of sound. In some examples, the TDOA determiner 306 determines the first virtual source time difference of arrival (e.g., $TDOA_{34}$) based on a difference between the first time and the second time, and populates row 716 with a corresponding TDOA value. The TDOA determiner 306 completes this process for the remaining audio sensor pairs and source locations to populate the remainder of the chart 702. The completed chart 702 may be stored in the data store 255, configuration memory 220, and/or transmitted to the TDOA matcher 308 for further processing.

Figure 8:
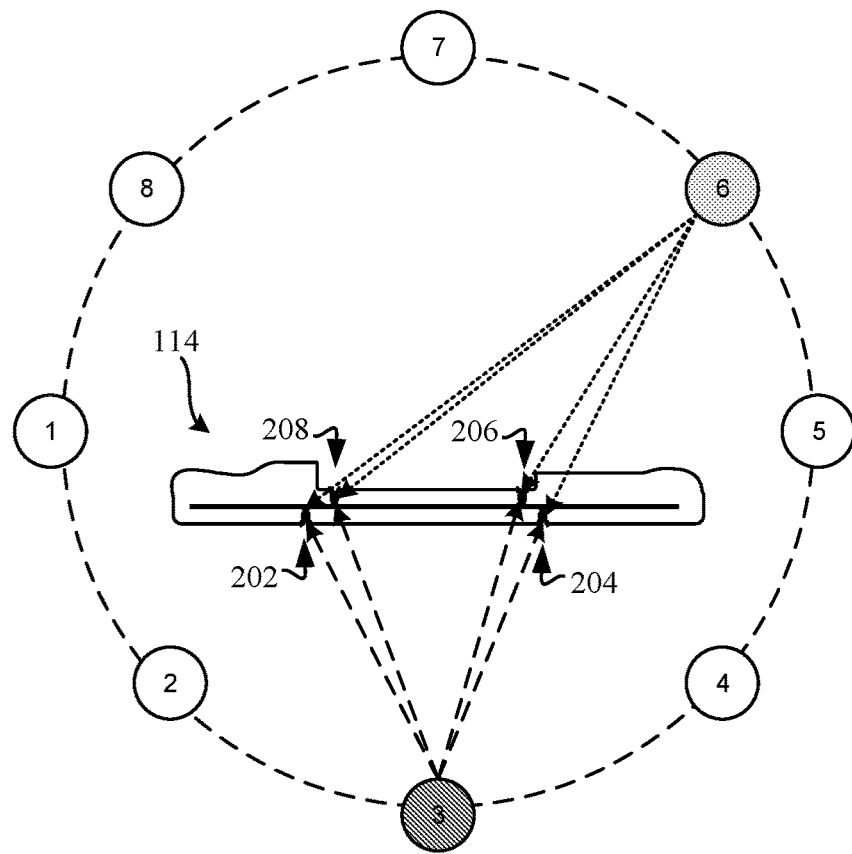
FIG. 8 is a diagram representing an example implementation of the example virtual audio source environment of FIG. 7.

FIG. 8 illustrates an example implementation of the examples disclosed herein. The illustrated example of FIG. 8 includes the example virtual source location environment 700, and the chart 702 of FIG. 7. However, in contrast to FIG. 7, the audio analyzer 240 has analyzed audio recordings and determined potential audio source locations, as identified in the first row 802 and the second row 804. In the illustrated example, the audio retriever 302 retrieves a first audio recording generated by the first audio sensor 202, a second audio recording generated by the second audio sensor 204, and a third audio recording generated by the third audio sensor 206. While the illustrated example is described with reference to only three audio recordings and audios sensors, any number of audio recordings and/or sensors may be utilized. For example, the audio retriever 302 can obtain a plurality of audio recordings for the first audio sensor 202, the second audio sensor 204, the third audio sensor 206, and the fourth audio sensor 208.

In the illustrated example, the audio transformer 304 processes the first audio recording using a short-time Fourier transform algorithm to obtain a first audio transform with first time-frequency bins. The audio transformer 304 of the illustrated example processes the second audio recording using the short-time Fourier transform algorithm to obtain a second audio transform with second time-frequency bins. The audio transformer 304 of the illustrated example processes the third audio recording using the short-time Fourier transform algorithm to obtain a third audio transform with third time-frequency bins. While examples disclosed herein are described using a short-time Fourier transform algorithm, the audio transformer 304 can perform any number of transforms to transform the audio recordings (e.g., audio signals) into the frequency domain. Subsequently, the TDOA determiner 306 calculates a first inter-channel time difference between phase values of the first transform and phase values of the second transform. In the illustrated example, the first inter-channel time difference is representative of the first time difference of arrival (e.g., $TDOA_{34}$). The TDOA determiner 306 calculates a second inter-channel time difference between the phase values of the first transform and phase values of the third transform. In the illustrated example, the second inter-channel time difference is representative of the second time difference of arrival (e.g., $TDOA_{12}$). The TDOA determiner 306 completes this process for all the audio recordings and audio sensor configurations.

The TDOA matcher 308 matches the inter-channel time differences (e.g., the difference in phase values) between the audio recordings and compares them to the virtual source time differences in the chart 702. For example, the TDOA matcher 308 determines a Euclidian distance between the TDOA's from the audio recordings to the TDOA's of the virtual source locations. In the illustrated example, the TDOA matcher 308 determines that audio is being produced by a presentation device from sources 3 and 6. In some examples, source 3 may be individuals who are watching a presentation device (e.g., a television) that is producing audio from source 6. As such, the TDOA matcher 308 may identify that audio recordings from audio sensors 202, 204 should be removed from further processing because they are producing background noise that negatively effects the audio of the media being presented. In some examples, the TDOA matcher 308 clusters the time-frequency bins corresponding to virtual source 6 to extract an estimated spatial source. In some examples, the estimated spatial source is utilized by the media identifier 230 and/or the central facility 190 to compute a fingerprint that is less noisy. The TDOA matcher 308 can transfer the results to the media identifier 230, and the media identifier 230 further analyzes the first and third audio recordings to determine media presented by the media presentation device, for example.

While an example manner of implementing the example meter 114 of FIG. 1 is illustrated in FIG. 2, one or more of the elements, processes and/or devices illustrated in FIG. 2 may be combined, divided, re-arranged, omitted, eliminated and/or implemented in any other way. Further, the example audio sensor 202, 204, 206, 208, the example audio sensor selector 210, the example configuration memory 220, the example media identifier 230, the example audio analyzer 240, the example configuration interface 245, the example audience measurement data controller 250, the example data store 255, the example network communicator 260, the example people identifier 270, the example power receiver 280, the example battery 285, and/or, more generally, the example meter 114 of FIGS. 1 and/or 2 may be implemented by hardware, software, firmware and/or any combination of hardware, software and/or firmware. Thus, for example, any of the example audio sensor 202, 204, 206, 208, the example audio sensor selector 210, the example configuration memory 220, the example media identifier 230, the example audio analyzer 240, the example configuration interface 245, the example audience measurement data controller 250, the example data store 255, the example network communicator 260, the example people identifier 270, the example power receiver 280, the example battery 285, and/or, more generally, the example meter 114 of FIGS. 1 and/or 2 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example audio sensor 202, 204, 206, 208, the example audio sensor selector 210, the example configuration memory 220, the example media identifier 230, the example audio analyzer 240, the example configuration interface 245, the example audience measurement data controller 250, the example data store 255, the example network communicator 260, the example people identifier 270, the example power receiver 280, the example battery 285 is/are hereby expressly defined to include a non-transitory computer readable storage device or storage disk such as a memory, a digital versatile disk (DVD), a compact disk (CD), a Blu-ray disk, etc. including the software and/or firmware. Further still, the example meter 114 of FIG. 2 may include one or more elements, processes and/or devices in addition to, or instead of, those illustrated in FIG. 2, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 9:
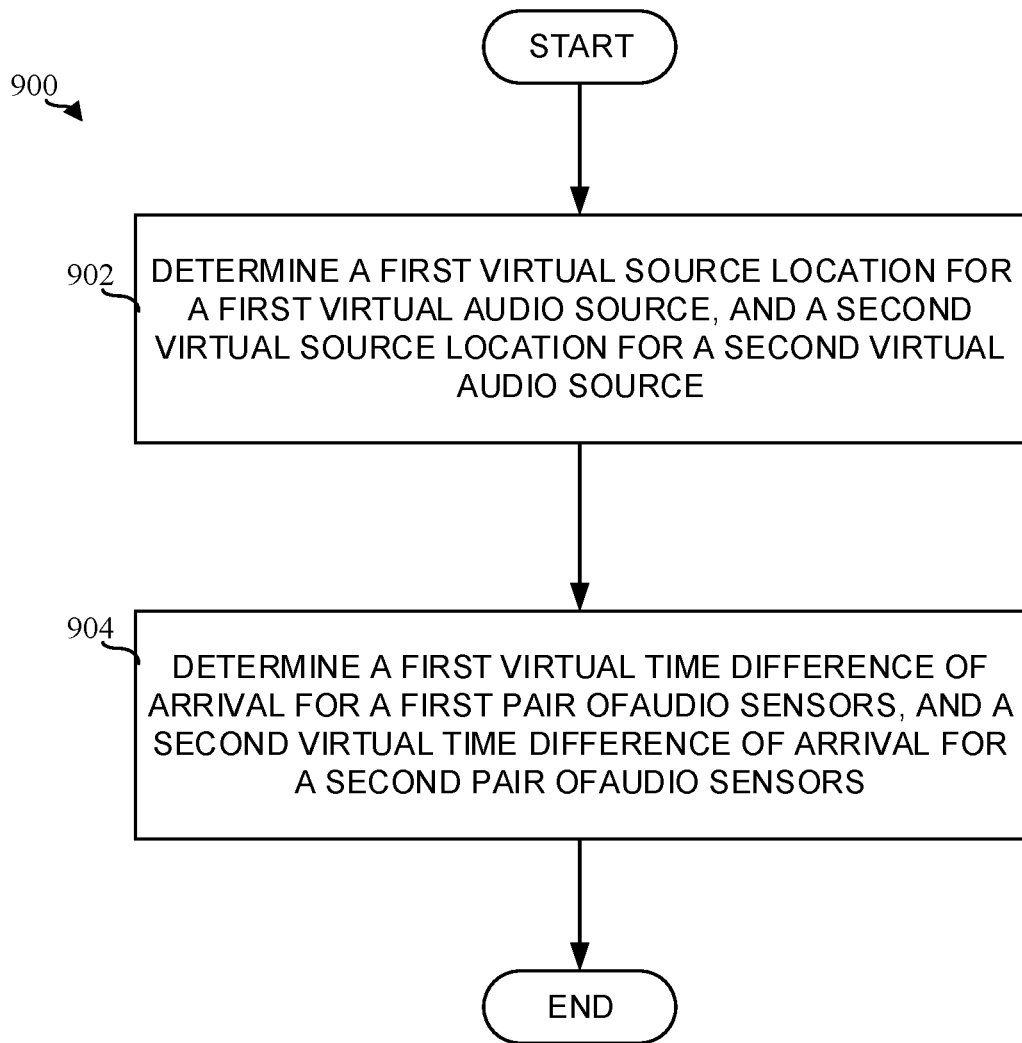
FIG. 9 is a flowchart representative of example machine-readable instructions that may be executed to implement the meter of FIGS. 1 and/or 2 to determine virtual time differences of arrival for pairs of audio sensors.
Figure 10:
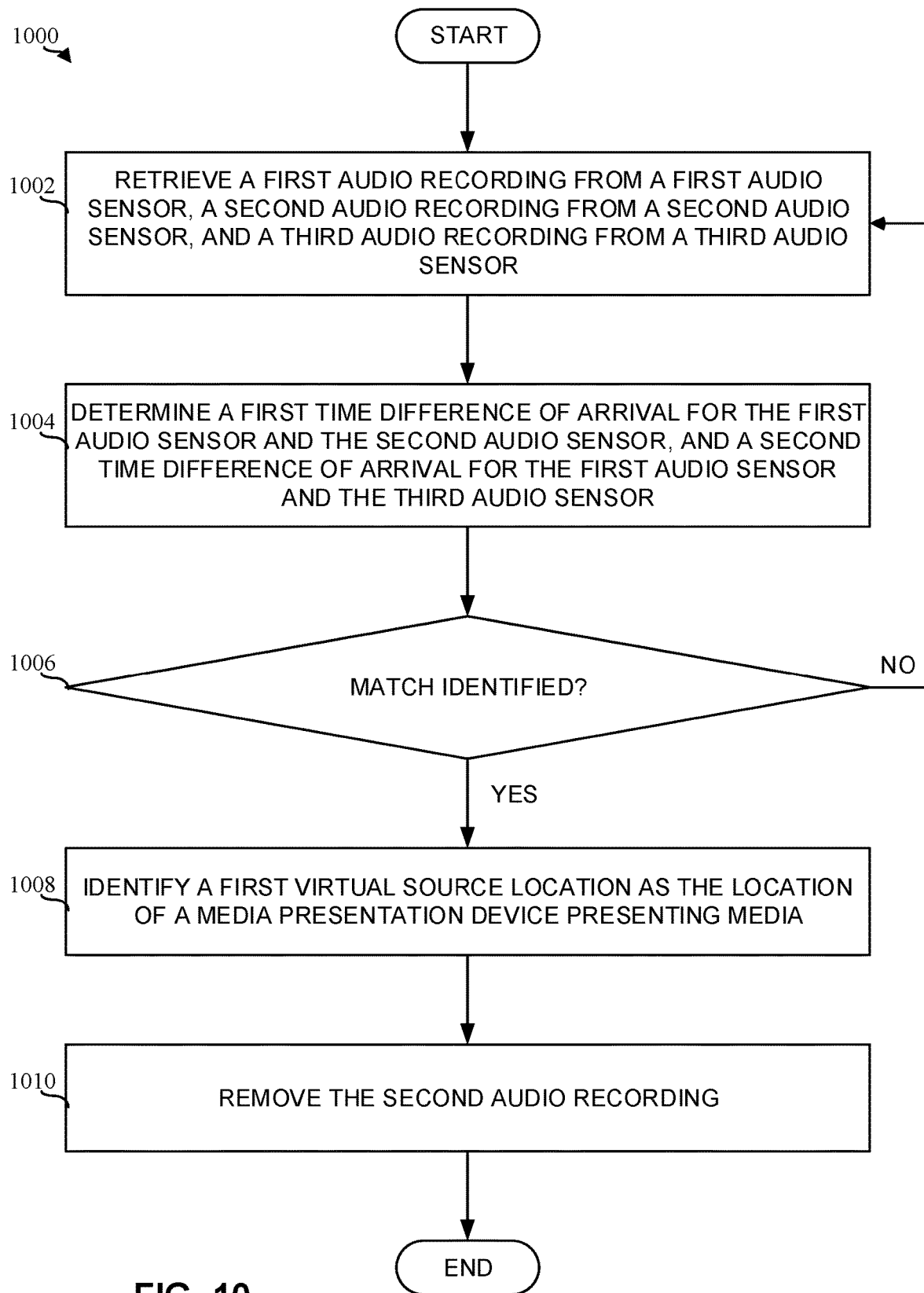
FIG. 10 is a flowchart representative of example machine-readable instructions that may be executed to implement the example meter of FIGS. 1 and/or 2 to remove unnecessary audio recordings to improve detection of audio signatures.

Flowcharts representative of example hardware logic, machine readable instructions, hardware implemented state machines, and/or any combination thereof for implementing the meter 114 of FIG. 2 are shown in FIGS. 9 and 10. The machine readable instructions may be one or more executable programs or portion(s) of an executable program for execution by a computer processor such as the processor 1112 shown in the example processor platform 1100 discussed below in connection with FIG. 11. The program may be embodied in software stored on a non-transitory computer readable storage medium such as a CD-ROM, a floppy disk, a hard drive, a DVD, a Blu-ray disk, or a memory associated with the processor 1112, but the entire program and/or parts thereof could alternatively be executed by a device other than the processor 1112 and/or embodied in firmware or dedicated hardware. Further, although the example program is described with reference to the flowcharts illustrated in FIGS. 9 and 10, many other methods of implementing the example meter 114 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine readable instructions described herein may be stored in one or more of a compressed format, an encrypted format, a fragmented format, a compiled format, an executable format, a packaged format, etc. Machine readable instructions as described herein may be stored as data (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein.

In another example, the machine readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example processes of FIGS. 9-10 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

FIG. 9 is a flowchart representative of example machine-readable instructions 900 that may be executed to implement the meter of FIGS. 1, 2, and/or 3 to determine virtual time differences of arrival for pairs of audio sensors. The example program 900 the illustrated example of FIG. 9 begins when the example virtual source determiner 300 determines a first virtual source location for a first virtual audio source, and a second virtual source location for a second virtual audio source (block 902). For example, the virtual audio source determiner 300 determines a first virtual source location and the second virtual source location by radially positioning the first and second virtual sources about the meter 114 at different angles.

The TDOA determiner 306 determines a first virtual time difference of arrival for a first pair of audio sensors, and a second virtual time difference of arrival for a second pair of audio sensors (block 904). For example, the TDOA determiner 306 calculates a first time for a first virtual signal coming from the virtual source 1 to reach the first audio sensor 202 based on a distance and/or the angle in the second column 706 of FIG. 7 of the virtual source 1 from the first audio sensor 202 and the speed of sound, calculates a second time for the first virtual signal coming from the virtual source 1 to reach the second audio sensor 204 based on a distance and/or the angle in the second column 706 of FIG. 7 of the virtual source 1 from the second audio sensor 204 and the speed of sound, and determines the first virtual source time difference of arrival (e.g., $TDOA_{34}$) based on a difference between the first time and the second time, and populates row 716 with a corresponding TDOA value. The example program 900 ends.

FIG. 10 is a flowchart representative of example machine-readable instructions 1000 that may be executed to implement the meter of FIGS. 1, 2, and/or 3 to remove unnecessary audio recordings to improve detection of audio signatures. The example program 1000 of the illustrated example of FIG. 10 begins when the example audio retriever 302 retrieves a first audio recording from a first audio sensor, a second recording from a second audio sensor, and a third audio recording from a third audio sensor (block 1002). For example, the audio retriever 302 retrieves a first audio recording generated by the first audio sensor 202, a second audio recording generated by the second audio sensor 204, and a third audio recording generated by the third audio sensor 206. In some examples, the audio transformer 304 processes 1) the first audio recording using a short-time Fourier transform to obtain a first audio transform with first time-frequency bins, 2) the second audio recording using the short-time Fourier transform to obtain a second audio transform with second time-frequency bins, and 3) the third audio recording using the short-time Fourier transform to obtain a third audio transform with third time-frequency bins.

The TDOA determiner 306 determines a first time difference of arrival for the first audio sensor and the second audio sensor, and a second time difference of arrival for the first audio sensor and the third audio sensor (block 1004). For example, the TDOA determiner 306 calculates a first inter-channel time difference between phase values of the first transform and phase values of the second transform. In the illustrated example, the first inter-channel time difference is representative of the first time difference of arrival. The TDOA determiner 306 calculates a second inter-channel time difference between the phase values of the first transform and phase values of the third transform. In the illustrated example, the second inter-channel time difference is representative of the second time difference of arrival.

Next, the TDOA matcher 308 determines if a match has been identified (block 1006). For example, the TDOA matcher 308 compares the virtual time difference of arrivals to the inter-channel time differences (e.g., the time difference of arrival values for the audio recordings) to determine the shortest Euclidian distance between the values. If the TDOA matcher 308 does not identify a match, the program 1000 returns to block 1002. If the TDOA matcher 308 identifies a match, the TDOA matcher 308 identifies a first virtual source location as the location of a media presentation device presenting media (block 1008). For example, the TDOA matcher 308 may identify the first virtual source 1 of FIG. 702 as matching the inter-channel time differences for the audio recordings from the first and third audio sensors 202, 206.

The TDOA matcher 308 removes the second audio recording (block 1010). For example, the TDOA matcher 308 removes the second audio recording to reduce a computational burden on the processor.

Figure 11:
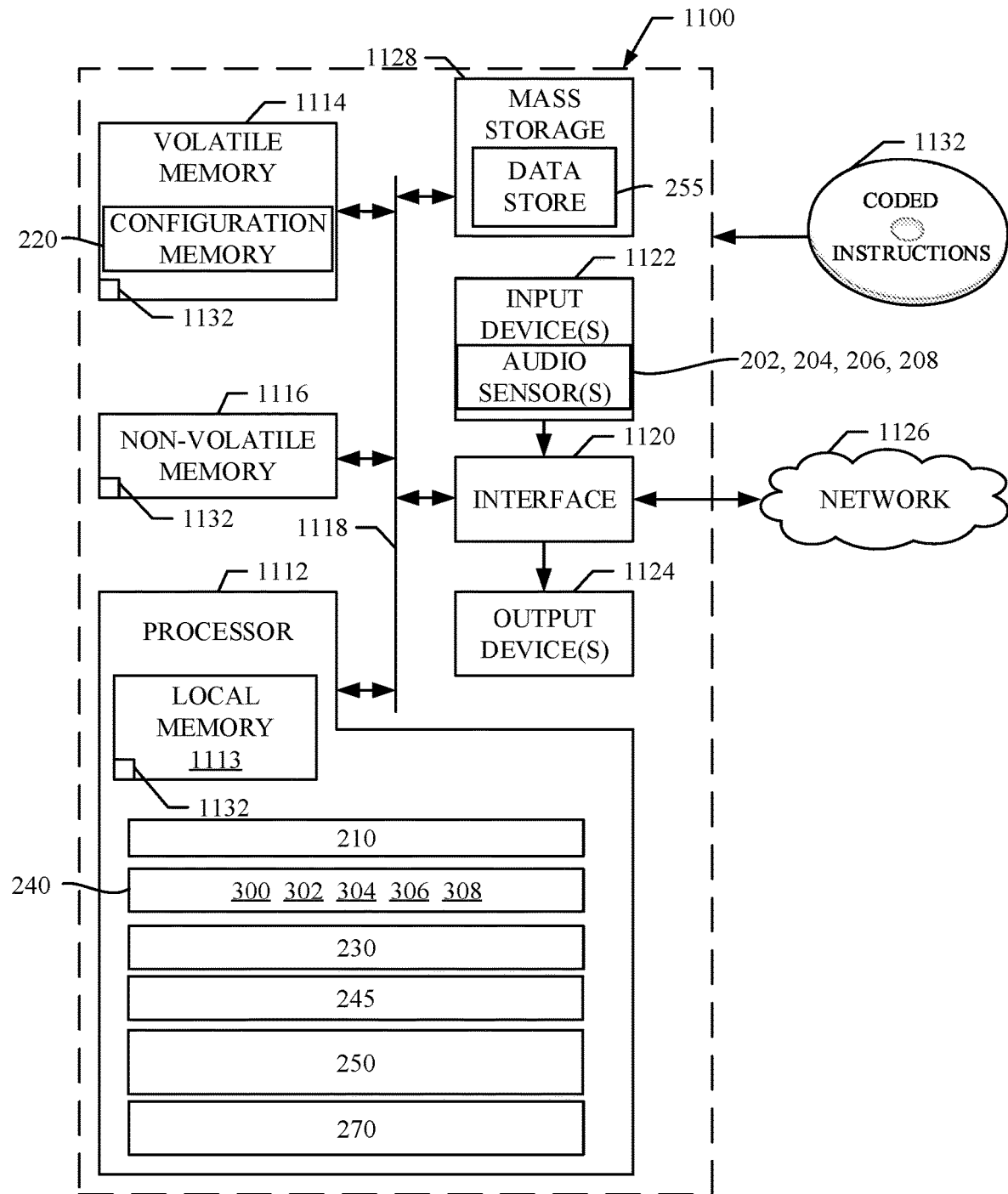
FIG. 11 is a block diagram of an example processor platform capable of executing the machine-readable instructions of FIGS. 9 and/or 10 in accordance with the teachings of this disclosure.

FIG. 11 is a block diagram of an example processor platform 1100 structured to execute the instructions of FIGS. 9-10 to implement the meter 114 of FIGS. 1 and/or 2. The processor platform 1100 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 1100 of the illustrated example includes a processor 1112. The processor 1112 of the illustrated example is hardware. For example, the processor 1112 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example audio sensor 202, 204, 206, 208, the example audio sensor selector 210, the example configuration memory 220, the example media identifier 230, the example audio analyzer 240, the example configuration interface 245, the example audience measurement data controller 250, the example data store 255, the example network communicator 260, the example people identifier 270, the example power receiver 280, the example battery 285, and/or, more generally, the example meter 114.

The processor 1112 of the illustrated example includes a local memory 1113 (e.g., a cache). The processor 1112 of the illustrated example is in communication with a main memory including a volatile memory 1114 and a non-volatile memory 1116 via a bus 1118. The volatile memory 1114 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1116 may be implemented by flash memory and/or any other desired type of memory device. Access to the main memory 1114, 1116 is controlled by a memory controller.

The processor platform 1100 of the illustrated example also includes an interface circuit 1120. The interface circuit 1120 may be implemented by any type of interface standard, such as an Ethernet interface, a universal serial bus (USB), a Bluetooth® interface, a near field communication (NFC) interface, and/or a PCI express interface.

In the illustrated example, one or more input devices 1122 are connected to the interface circuit 1120. The input device(s) 1122 permit(s) a user to enter data and/or commands into the processor 1012. The input device(s) can be implemented by, for example, an audio sensor, a microphone, a camera (still or video), a keyboard, a button, a mouse, a touchscreen, a track-pad, a trackball, isopoint and/or a voice recognition system. In the illustrated example of FIG. 11, the example input device(s) 1122 implement the example audio sensor(s) 202, 204, 206, 208.

One or more output devices 1124 are also connected to the interface circuit 1120 of the illustrated example. The output devices 1124 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 1120 of the illustrated example, thus, typically includes a graphics driver card, a graphics driver chip and/or a graphics driver processor.

The interface circuit 1120 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1126. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1100 of the illustrated example also includes one or more mass storage devices 1128 for storing software and/or data. Examples of such mass storage devices 1128 include floppy disk drives, hard drive disks, compact disk drives, Blu-ray disk drives, redundant array of independent disks (RAID) systems, and digital versatile disk (DVD) drives.

The machine executable instructions 1132 of FIGS. 9 and 10 may be stored in the mass storage device 1128, in the volatile memory 1114, in the non-volatile memory 1116, and/or on a removable non-transitory computer readable storage medium such as a CD or DVD.

From the foregoing, it will be appreciated that example methods, apparatus and articles of manufacture have been disclosed that improve the detection of audio signatures. Examples disclosed herein overcome the above problems by removing audio signals (e.g., audio recordings) from fingerprint processing based on phase differences between transformed audio signals to reduce a computational burden on a processor. Examples disclosed herein remove audio signals based on phase differences between transformed audio, thereby resulting in increased accuracy of identifying media associated with the fingerprint. In addition, examples disclosed herein utilize the transformed audio signals to generate fingerprints that are less noisy, thereby improving detection of audio signatures. As such, examples disclosed herein utilize peak values of portions of the transformed audio signals which reduces the amount of audio to be processed during the fingerprinting computations (e.g., processor does not need to process the entire audio signal). The disclosed methods, apparatus and articles of manufacture improve the efficiency of using a computing device by removing audio signals (e.g., audio recordings) from fingerprint processing based on phase differences between transformed audio signals. The disclosed methods, apparatus and articles of manufacture are accordingly directed to one or more improvement(s) in the functioning of a computer.

The following paragraphs provide various examples of the examples disclosed herein.

Example 1 includes an apparatus comprising a TDOA determiner to determine a first time difference of arrival for a first audio sensor of a meter and a second audio sensor of the meter based on a first audio recording from the first audio sensor and a second audio recording from the second audio sensor, and a second time difference of arrival for the first audio sensor and a third audio sensor of the meter based on the first audio recording and a third audio recording from the third audio sensor, and a TDOA matcher to determine a match by comparing the first time difference of arrival to i) a first virtual source time difference of arrival and ii) a second virtual source time difference of arrival, in response to determining that the first time difference of arrival matches the first virtual source time difference of arrival, identify a first virtual source location as the location of a media presentation device presenting media, and remove the second audio recording to reduce a computational burden on the processor.

Example 2 includes the apparatus of example 1, wherein the meter includes the first audio sensor positioned at a first position on the meter, the second audio sensor positioned at a second position on the meter, the third audio sensor positioned at a third position on the meter, and a fourth audio sensor positioned at a fourth position on the meter.

Example 3 includes the apparatus of example 2, wherein determining the first virtual source location and a second virtual source location is based on the first position, the second position, the third position, and the fourth position.

Example 4 includes the apparatus of example 1, further including a virtual source determiner to determine the first virtual source location for a first virtual audio source radially positioned about the meter, and the second virtual source location for a second virtual audio source radially positioned around the meter, the first virtual source location different than the second virtual source location, and determine the first virtual source time difference of arrival for a first pair of audio sensors of the meter based on the first virtual source location, and the second virtual source time difference of arrival for a second pair of audio sensors of the meter based on the second virtual source location.

Example 5 includes the apparatus of example 4, wherein the first pair of audio sensors includes the first audio sensor and the second audio sensor, and the second pair of audio sensors includes the first audio sensor and the third audio sensor.

Example 6 includes the apparatus of example 5, wherein the virtual source determiner to calculate a first time for a first virtual signal to reach the first audio sensor based on a distance of the first virtual source from the first audio sensor and the speed of sound, calculate a second time for the first virtual signal to reach the second audio sensor based on a distance of the first virtual source from the second audio sensor and the speed of sound, and determine the first virtual source time difference of arrival based on a difference between the first time and the second time.

Example 7 includes the apparatus of example 5, wherein the virtual source determiner to calculate a third time for a second virtual signal to reach the first audio sensor based on a distance of the second virtual source from the first audio sensor and the speed of sound, calculate a fourth time for the second virtual signal to reach the third audio sensor based on a distance of the second virtual source from the third audio sensor and the speed of sound, and determine the second virtual source time difference of arrival based on a difference between the third time and the fourth time.

Example 8 includes the apparatus of example 1, further including an audio transformer to process the first audio recording using a short-time Fourier transform to obtain a first audio transform with first time-frequency bins, process the second audio recording using the short-time Fourier transform to obtain a second audio transform with second time-frequency bins, and process the third audio recording using the short-time Fourier transform to obtain a third audio transform with third time-frequency bins.

Example 9 includes the apparatus of example 8, wherein the TDOA determiner to calculate a first inter-channel time difference between the first transform and the second transform, the first inter-channel time difference representative of the first time difference of arrival, and calculate a second inter-channel time difference between the first transform and the third transform, the second inter-channel time difference representative of the second time difference of arrival.

Example 10 includes a method comprising determining, by executing an instruction with a processor, a first time difference of arrival for a first audio sensor of a meter and a second audio sensor of the meter based on a first audio recording from the first audio sensor and a second audio recording from the second audio sensor, and a second time difference of arrival for the first audio sensor and a third audio sensor of the meter based on the first audio recording and a third audio recording from the third audio sensor, determining, by executing an instruction with the processor, a match by comparing the first time difference of arrival to i) a first virtual source time difference of arrival and ii) a second virtual source time difference of arrival, in response to determining that the first time difference of arrival matches the first virtual source time difference of arrival, identifying, by executing an instruction with the processor, a first virtual source location as the location of a media presentation device presenting media, and removing, by executing an instruction with the processor, the second audio recording to reduce a computational burden on the processor.

Example 11 includes the method of example 10, wherein the meter includes the first audio sensor positioned at a first position on the meter, the second audio sensor positioned at a second position on the meter, the third audio sensor positioned at a third position on the meter, and a fourth audio sensor positioned at a fourth position on the meter, the determining of the first virtual source location and a second virtual source location is based on the first position, the second position, the third position, and the fourth position.

Example 12 includes the method of example 10, further including determining the first virtual source location for a first virtual audio source radially positioned about the meter, and the second virtual source location for a second virtual audio source radially positioned around the meter, the first virtual source location different than the second virtual source location, and determining the first virtual source time difference of arrival for a first pair of audio sensors of the meter based on the first virtual source location, and the second virtual source time difference of arrival for a second pair of audio sensors of the meter based on the second virtual source location.

Example 13 includes the method of example 10, wherein determining the first virtual source time difference of arrival based on the first virtual source location includes calculating a first time for a first virtual signal to reach the first audio sensor based on a distance of the first virtual source from the first audio sensor and the speed of sound, calculating a second time for the first virtual signal to reach the second audio sensor based on a distance of the first virtual source from the second audio sensor and the speed of sound, and determining the first virtual source time difference of arrival based on a difference between the first time and the second time.

Example 14 includes the method of example 10, wherein determining the second virtual source time difference of arrival based on the second virtual source location includes calculating a third time for a second virtual signal to reach the first audio sensor based on a distance of the second virtual source from the first audio sensor and the speed of sound, calculating a fourth time for the second virtual signal to reach the third audio sensor based on a distance of the second virtual source from the third audio sensor and the speed of sound, and determining the second virtual source time difference of arrival based on a difference between the third time and the fourth time.

Example 15 includes the method of example 10, further including processing the first audio recording using a short-time Fourier transform to obtain a first audio transform with first time-frequency bins, processing the second audio recording using the short-time Fourier transform to obtain a second audio transform with second time-frequency bins, and processing the third audio recording using the short-time Fourier transform to obtain a third audio transform with third time-frequency bins.

Example 16 includes the method of example 15, further including calculating a first inter-channel time difference between the first transform and the second transform, the first inter-channel time difference representative of the first time difference of arrival, and calculating a second inter-channel time difference between the first transform and the third transform, the second inter-channel time difference representative of the second time difference of arrival.

Example 17 includes a non-transitory computer readable medium comprising instructions that, when executed, cause a machine to at least determine a first time difference of arrival for a first audio sensor of a meter and a second audio sensor of the meter based on a first audio recording from the first audio sensor and a second audio recording from the second audio sensor, and a second time difference of arrival for the first audio sensor and a third audio sensor of the meter based on the first audio recording and a third audio recording from the third audio sensor, determine a match by comparing the first time difference of arrival to i) a first virtual source time difference of arrival and ii) a second virtual source time difference of arrival, in response to determining that the first time difference of arrival matches the first virtual source time difference of arrival, identify a first virtual source location as the location of a media presentation device presenting media, and remove the second audio recording to reduce a computational burden on the processor.

Example 18 includes the non-transitory computer readable medium of example 17, wherein the instructions further cause the machine to determine the first virtual source location for a first virtual audio source radially positioned about the meter, and the second virtual source location for a second virtual audio source radially positioned around the meter, the first virtual source location different than the second virtual source location, and determine the first virtual source time difference of arrival for a first pair of audio sensors of the meter based on the first virtual source location, and the second virtual source time difference of arrival for a second pair of audio sensors of the meter based on the second virtual source location, the first pair of audio sensors includes the first audio sensor and the second audio sensor, and the second pair of audio sensors includes the first audio sensor and the third audio sensor.

Example 19 includes the non-transitory computer readable medium of example 18, wherein the instructions further cause the machine to calculate a first time for a first virtual signal to reach the first audio sensor based on a distance of the first virtual source from the first audio sensor and the speed of sound, calculate a second time for the first virtual signal to reach the second audio sensor based on a distance of the first virtual source from the second audio sensor and the speed of sound, determine the first virtual source time difference of arrival based on a difference between the first time and the second time, calculate a third time for a second virtual signal to reach the first audio sensor based on a distance of the second virtual source from the first audio sensor and the speed of sound, calculate a fourth time for the second virtual signal to reach the third audio sensor based on a distance of the second virtual source from the third audio sensor and the speed of sound, and determine the second virtual source time difference of arrival based on a difference between the third time and the fourth time.

Example 20 includes the non-transitory computer readable medium of example 17, wherein the instructions further cause the machine to process the first audio recording using a short-time Fourier transform to obtain a first audio transform with first time-frequency bins, process the second audio recording using the short-time Fourier transform to obtain a second audio transform with second time-frequency bins, process the third audio recording using the short-time Fourier transform to obtain a third audio transform with third time-frequency bins. calculate a first inter-channel time difference between the first transform and the second transform, the first inter-channel time difference representative of the first time difference of arrival, and calculate a second inter-channel time difference between the first transform and the third transform, the second inter-channel time difference representative of the second time difference of arrival.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. A method comprising:
generating a plurality of virtual sources at a plurality of angles relative to a computing device;
determining a virtual source time difference of arrival for one or more virtual sources of the plurality of the virtual sources;
determining a first time difference of arrival for a first audio recording associated with a first pair of audio sensors of the computing device;
comparing the first time difference of arrival to the virtual source time difference of arrival; and
in response to a determination that the first time difference of arrival aligns with the virtual source time difference of arrival, identifying a first virtual source location as a location of a media presentation device presenting media captured by the first pair of the audio sensors.

2. The method of claim 1, wherein the plurality of angles relative to the computing device comprises a plurality of radially spaced different angles relative to the computing device.

3. The method of claim 1, further comprising:
determining a second time difference of arrival for a second audio recording associated with a second pair of audio sensors of the computing device; and comparing the second time difference of arrival to the virtual source time difference of arrival.

4. The method of claim 3, further comprising removing the second audio recording to reduce noise.

5. The method of claim 3, further comprising removing the second audio recording to reduce computational burden.

6. The method of claim 3, wherein the first pair of audio sensors includes a first audio sensor and a second audio sensor, and wherein the second pair of audio sensors includes the first audio sensor and a third audio sensor.

7. The method of claim 6, further comprising:
calculating a first time for a first virtual signal to reach the first audio sensor based on a distance of the first virtual source location from the first audio sensor and speed of sound;
calculating a second time for the first virtual signal to reach the second audio sensor based on a distance of the first virtual source location from the second audio sensor and the speed of sound; and
determining a particular virtual source time difference of arrival based on a difference between the first time and the second time.

8. The method of claim 3, further comprising processing at least one of the first audio recording and the second audio recording using a short-time Fourier transform to obtain audio transforms with time-frequency bins.

9. The method of claim 8, further comprising calculating an inter-channel time difference between a first transform and a second transform, wherein the inter-channel time difference indicates the first time difference of arrival.

10. A non-transitory computer readable medium comprising instructions that, when executed, cause at least one processor to perform a set of operations comprising:
generating a plurality of virtual sources at a plurality of angles relative to a computing device;
determining a virtual source time difference of arrival for one or more virtual sources of the plurality of the virtual sources;
determining a first time difference of arrival for a first audio recording associated with a first pair of audio sensors of the computing device;
comparing the first time difference of arrival to the virtual source time difference of arrival; and
in response to a determination that the first time difference of arrival aligns with the virtual source time difference of arrival, identifying a first virtual source location as a location of a media presentation device presenting media captured by the first pair of the audio sensors.

11. The non-transitory computer readable medium of claim 10, wherein the plurality of angles relative to the computing device comprises a plurality of radially spaced different angles relative to the computing device.

12. The non-transitory computer readable medium of claim 10, wherein the set of operations further comprises:
determining a second time difference of arrival for a second audio recording associated with a second pair of audio sensors of the computing device; and
comparing the second time difference of arrival to the virtual source time difference of arrival.

13. The non-transitory computer readable medium of claim 12, wherein the set of operations further comprises removing the second audio recording to reduce noise.

14. The non-transitory computer readable medium of claim 12, wherein the set of operations further comprises removing the second audio recording to reduce computational burden.

15. The non-transitory computer readable medium of claim 12, wherein the first pair of audio sensors includes a first audio sensor and a second audio sensor, and wherein the second pair of audio sensors includes the first audio sensor and a third audio sensor.

16. The non-transitory computer readable medium of claim 15, wherein the set of operations further comprises:
calculating a first time for a first virtual signal to reach the first audio sensor based on a distance of the first virtual source location from the first audio sensor and speed of sound;
calculating a second time for the first virtual signal to reach the second audio sensor based on a distance of the first virtual source location from the second audio sensor and the speed of sound; and
determining a particular virtual source time difference of arrival based on a difference between the first time and the second time.

17. The non-transitory computer readable medium of claim 12, wherein the set of operations further comprises processing at least one of the first audio recording and the second audio recording using a short-time Fourier transform to obtain audio transforms with time-frequency bins.

18. The non-transitory computer readable medium of claim 17, wherein the set of operations further comprises calculating an inter-channel time difference between a first transform and a second transform, wherein the inter-channel time difference indicates the first time difference of arrival.

19. A computing device comprising:
at least one processor; and
a non-transitory computer readable medium comprising instructions that, when executed, cause the at least one processor to perform a set of operations comprising:
generating a plurality of virtual sources at a plurality of angles relative to the computing device;
determining a virtual source time difference of arrival for one or more virtual sources of the plurality of the virtual sources;
determining a first time difference of arrival for a first audio recording associated with a first pair of audio sensors of the computing device;
comparing the first time difference of arrival to the virtual source time difference of arrival; and
in response to a determination that the first time difference of arrival aligns with the virtual source time difference of arrival, identifying a first virtual source location as a location of a media presentation device presenting media captured by the first pair of the audio sensors.

20. The computing device of claim 19, wherein the plurality of angles relative to the computing device comprises a plurality of radially spaced different angles relative to the computing device.

* * * * *